US009813970B2

(12) United States Patent
Madan et al.

(10) Patent No.: US 9,813,970 B2
(45) Date of Patent: Nov. 7, 2017

(54) SYSTEM AND METHOD TO PROVIDE SMALL CELL POWER CONTROL AND LOAD BALANCING FOR HIGH MOBILITY USER EQUIPMENT IN A NETWORK ENVIRONMENT

(71) Applicant: CISCO TECHNOLOGY, INC., San Jose, CA (US)

(72) Inventors: Ritesh K. Madan, Berkeley, CA (US); Ehsan Haghani, Redwood City, CA (US); Rohit Umesh Nabar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 15/002,187

(22) Filed: Jan. 20, 2016

(65) Prior Publication Data

US 2017/0208526 A1 Jul. 20, 2017

(51) Int. Cl.
*H04W 36/32* (2009.01)
*H04W 72/04* (2009.01)
(Continued)

(52) U.S. Cl.
CPC ....... *H04W 36/32* (2013.01); *H04W 36/0094* (2013.01); *H04W 36/22* (2013.01);
(Continued)

(58) Field of Classification Search
CPC ............... H04W 72/082; H04W 36/32; H04W 36/0094; H04W 36/22; H04W 52/285; H04W 72/0473
See application file for complete search history.

(56) References Cited

U.S. PATENT DOCUMENTS 6,141,565 A 10/2000 Feuerstein et al.
6,456,848 B1 9/2002 Freeman
(Continued)

FOREIGN PATENT DOCUMENTS

CN 1334999 A 2/2002
CN 101444125 A 5/2009
(Continued)

OTHER PUBLICATIONS

U.S. Appl. No. 15/251,471, filed Aug. 30, 2016, entitled "Method and Apparatus for Reducing Inter-Cell Interference," Inventor: Ziv Nuss, et al.
(Continued)

*Primary Examiner* — Khaled Kassim
*Assistant Examiner* — Syed S Ali
(74) *Attorney, Agent, or Firm* — Patterson + Sheridan, LLP

(57) ABSTRACT

A method is provided in one example embodiment and may include generating feedback information by a small cell radio and a macro cell radio; setting a high mobility handover threshold for the macro cell radio based, at least in part, on the feedback information, wherein the high mobility handover threshold is used to trigger handover of one or more high mobility user equipment (UE) associated with the macro cell radio to the small cell radio; and setting a maximum downlink transmit power for the small cell radio based, at least in part, on the feedback information and the high mobility handover threshold.

18 Claims, 10 Drawing Sheets

(51) Int. Cl.
*H04W 36/22* (2009.01)
*H04W 52/28* (2009.01)
*H04W 36/00* (2009.01)
*H04W 72/08* (2009.01)

(52) U.S. Cl.
CPC ..... *H04W 52/285* (2013.01); *H04W 72/0473* (2013.01); *H04W 72/082* (2013.01)

(56) References Cited

U.S. PATENT DOCUMENTS

| | | |
|---|---|---|
| 6,463,296 B1 | 10/2002 | Esmailzadeh |
| 6,600,924 B1 | 7/2003 | Sinivaara |
| 6,771,934 B2 | 8/2004 | Demers |
| 7,151,937 B2 | 12/2006 | Jin et al. |
| 7,158,474 B1 | 1/2007 | Gerakoulis |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,078,185 B2 | 12/2011 | Sun |
| 8,107,950 B2 | 1/2012 | Amerijoo et al. |
| 8,126,495 B2 | 2/2012 | Wu |
| 8,145,223 B2 | 3/2012 | Guey |
| 8,145,252 B2 | 3/2012 | Sung et al. |
| 8,170,544 B1 | 5/2012 | Satapathy et al. |
| 8,194,630 B2 | 6/2012 | Qvarfordt |
| 8,208,937 B2 | 6/2012 | Zhang |
| 8,229,451 B2 | 7/2012 | Frenger et al. |
| 8,270,976 B2 | 9/2012 | Simonsson et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,731,567 B2 | 5/2014 | Zhang |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,805,373 B2 | 8/2014 | Chayat |
| 8,805,385 B2 | 8/2014 | Hunukumbure |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,879,441 B2 | 11/2014 | Hunukumbure |
| 8,983,470 B1 | 3/2015 | Ryan |
| 9,014,004 B2 | 4/2015 | Nuss et al. |
| 9,031,591 B2 | 5/2015 | Ma et al. |
| 9,094,831 B2 | 7/2015 | Borran |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,197,358 B2 | 11/2015 | Hejazi |
| 9,219,816 B2 | 12/2015 | Grayson |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 9,490,953 B2 | 11/2016 | Yanover et al. |
| 9,497,708 B2 | 11/2016 | Uplenchwar et al. |
| 9,544,857 B2 | 1/2017 | Carter et al. |
| 9,559,798 B2 | 1/2017 | Nuss et al. |
| 9,648,569 B2 | 5/2017 | Madan et al. |
| 9,655,102 B2 | 5/2017 | Uplenchwar et al. |
| 2002/0019245 A1 | 2/2002 | Longoni |
| 2002/0061742 A1 | 5/2002 | Lapaille |
| 2004/0085909 A1 | 5/2004 | Soliman |
| 2004/0132486 A1 | 7/2004 | Halonen |
| 2004/0213170 A1 | 10/2004 | Bremer |
| 2005/0063389 A1 | 3/2005 | Elliott |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2006/0292989 A1 | 12/2006 | Gerlach |
| 2007/0008885 A1 | 1/2007 | Bonner |
| 2007/0082620 A1 | 4/2007 | Zhang et al. |
| 2007/0086406 A1 | 4/2007 | Papasakellariou |
| 2007/0115874 A1 | 5/2007 | Usuda |
| 2007/0177501 A1 | 8/2007 | Papasakellariou |
| 2007/0253372 A1 | 11/2007 | Nakayasu |
| 2007/0280170 A1 | 12/2007 | Kawasaki |
| 2008/0004028 A1 | 1/2008 | Vincent |
| 2008/0043623 A1 | 2/2008 | Franceschini |
| 2008/0045227 A1 | 2/2008 | Nagai |
| 2008/0084844 A1 | 4/2008 | Reznik |
| 2008/0107074 A1 | 5/2008 | Salmenkaita et al. |
| 2008/0139197 A1 | 6/2008 | Misra et al. |
| 2008/0188234 A1 | 8/2008 | Gorokhov |
| 2008/0188265 A1 | 8/2008 | Carter et al. |
| 2008/0268833 A1 | 10/2008 | Huang |
| 2009/0005030 A1 | 1/2009 | Han |
| 2009/0054047 A1 | 2/2009 | Kylvaja |
| 2009/0061778 A1 | 3/2009 | Vrzic |
| 2009/0067370 A1 | 3/2009 | Kim |
| 2009/0081955 A1 | 3/2009 | Necker |
| 2009/0092080 A1 | 4/2009 | Balasubramanian |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0270109 A1 | 10/2009 | Wang Helmersson |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0105406 A1 | 4/2010 | Luo |
| 2010/0110989 A1 | 5/2010 | Wu |
| 2010/0112982 A1 | 5/2010 | Singh et al. |
| 2010/0124930 A1 | 5/2010 | Andrews |
| 2010/0177722 A1 | 7/2010 | Guvenc |
| 2010/0227611 A1 | 9/2010 | Schmidt et al. |
| 2010/0233962 A1 | 9/2010 | Johansson |
| 2010/0240314 A1 | 9/2010 | Chang |
| 2010/0248737 A1 | 9/2010 | Smith |
| 2010/0260036 A1 | 10/2010 | Molnar et al. |
| 2010/0260068 A1 | 10/2010 | Bhatt et al. |
| 2010/0267338 A1 | 10/2010 | Chiu |
| 2010/0267408 A1 | 10/2010 | Lee et al. |
| 2010/0279628 A1 | 11/2010 | Love et al. |
| 2010/0285795 A1 | 11/2010 | Whinnett |
| 2010/0309864 A1 | 12/2010 | Tamaki |
| 2010/0311449 A1 | 12/2010 | Whinnett |
| 2010/0317351 A1 | 12/2010 | Gerstenberger |
| 2010/0322109 A1 | 12/2010 | Ahn |
| 2011/0034174 A1 | 2/2011 | Xu |
| 2011/0039539 A1 | 2/2011 | Maida et al. |
| 2011/0039570 A1 | 2/2011 | Maida et al. |
| 2011/0070911 A1 | 3/2011 | Zhang |
| 2011/0077016 A1 | 3/2011 | Stolyar et al. |
| 2011/0081865 A1 | 4/2011 | Xiao |
| 2011/0086614 A1 | 4/2011 | Brisebois |
| 2011/0092209 A1 | 4/2011 | Gaal |
| 2011/0098072 A1 | 4/2011 | Kim |
| 2011/0110316 A1 | 5/2011 | Chen et al. |
| 2011/0128862 A1 | 6/2011 | Kallin |

(56) References Cited

U.S. PATENT DOCUMENTS

| | | |
|---|---|---|
| 2011/0136478 A1 | 6/2011 | Trigui |
| 2011/0151877 A1 | 6/2011 | Tafreshi |
| 2011/0151881 A1 | 6/2011 | Chou |
| 2011/0171911 A1 | 7/2011 | Liu |
| 2011/0176497 A1 | 7/2011 | Gopalakrishnan |
| 2011/0182375 A1 | 7/2011 | Kim et al. |
| 2011/0188441 A1 | 8/2011 | Kim |
| 2011/0194423 A1 | 8/2011 | Cho |
| 2011/0195730 A1 | 8/2011 | Chami |
| 2011/0195732 A1 | 8/2011 | Kim |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2011/0317742 A1 | 12/2011 | Kawahatsu |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046028 A1 | 2/2012 | Damnjanovic |
| 2012/0046063 A1 | 2/2012 | Chande |
| 2012/0083201 A1 | 4/2012 | Truong |
| 2012/0087247 A1 | 4/2012 | Min et al. |
| 2012/0087266 A1 | 4/2012 | Vajapeyam |
| 2012/0100849 A1 | 4/2012 | Marsico |
| 2012/0115534 A1 | 5/2012 | Luo |
| 2012/0129537 A1 | 5/2012 | Liu et al. |
| 2012/0157155 A1 | 6/2012 | Cho |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0243431 A1 | 9/2012 | Chen et al. |
| 2012/0258720 A1 | 10/2012 | Tinnakornsurisphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau |
| 2013/0044704 A1 | 2/2013 | Pang |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310019 A1 | 11/2013 | Visotsky |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0087747 A1 | 3/2014 | Kronestedt |
| 2014/0092765 A1 | 4/2014 | Agarwal et al. |
| 2014/0098757 A1 | 4/2014 | Khandekar |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148149 A1 | 5/2014 | Kwan |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0200001 A1* | 7/2014 | Song ............... H04W 36/0094 455/436 |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0233530 A1* | 8/2014 | Damnjanovic ....... H04W 48/12 370/331 |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302851 A1* | 10/2014 | Yiu ....................... H04W 76/00 455/436 |
| 2014/0302859 A1 | 10/2014 | Nama |
| 2014/0307685 A1 | 10/2014 | Takano |
| 2014/0321304 A1 | 10/2014 | Yu |
| 2014/0328277 A1 | 11/2014 | Xiao et al. |
| 2014/0328327 A1 | 11/2014 | Xiao et al. |
| 2014/0335909 A1 | 11/2014 | Czerepinski |
| 2014/0378145 A1* | 12/2014 | Legg ................. H04W 36/0083 455/437 |
| 2015/0004975 A1* | 1/2015 | Yamamoto ........... H04W 36/30 455/436 |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen |
| 2015/0063225 A1* | 3/2015 | Kanamarlapudi .. H04W 76/045 370/329 |
| 2015/0063231 A1 | 3/2015 | Seo et al. |
| 2015/0087325 A1 | 3/2015 | Nuss et al. |
| 2015/0105025 A1 | 4/2015 | Zhang |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237588 A1 | 8/2015 | Zhao et al. |
| 2015/0237637 A1 | 8/2015 | Venkatraman |
| 2015/0256314 A1 | 9/2015 | Gauvreau et al. |
| 2015/0282033 A1* | 10/2015 | Lunden ............. H04W 36/0055 455/436 |
| 2015/0282104 A1* | 10/2015 | Damnjanovic ..... H04W 52/365 455/522 |

(56) References Cited

U.S. PATENT DOCUMENTS

| | | | |
|---|---|---|---|
| 2015/0296430 A1* | 10/2015 | Bakker | H04W 36/0094 455/444 |
| 2015/0312778 A1 | 10/2015 | Chandrasekhar et al. | |
| 2015/0318994 A1 | 11/2015 | Walsh et al. | |
| 2015/0351072 A1 | 12/2015 | Okmyanskiy et al. | |
| 2015/0365855 A1 | 12/2015 | Nuss et al. | |
| 2015/0365865 A1* | 12/2015 | Belschner | H04W 36/20 455/436 |
| 2015/0373698 A1 | 12/2015 | Uplenchwar et al. | |
| 2015/0382367 A1 | 12/2015 | Yanover et al. | |
| 2016/0073426 A1 | 3/2016 | Bull et al. | |
| 2016/0094319 A1 | 3/2016 | Chaudhuri | |
| 2016/0127069 A1 | 5/2016 | Nuss et al. | |
| 2016/0150442 A1 | 5/2016 | Kwan | |
| 2016/0157126 A1 | 6/2016 | Nuss et al. | |
| 2016/0165485 A1 | 6/2016 | Kwan | |
| 2016/0198412 A1 | 7/2016 | Uplenchwar et al. | |
| 2016/0211955 A1 | 7/2016 | Wu | |
| 2016/0219596 A1 | 7/2016 | Yanover et al. | |
| 2016/0242122 A1 | 8/2016 | Yue | |
| 2016/0309356 A1 | 10/2016 | Madan et al. | |
| 2016/0309476 A1 | 10/2016 | Madan et al. | |
| 2016/0315728 A1* | 10/2016 | Palenius | H04W 48/16 |
| 2016/0373202 A1 | 12/2016 | Nuss et al. | |
| 2017/0034795 A1 | 2/2017 | Madan | |
| 2017/0041938 A1 | 2/2017 | Nabar | |
| 2017/0055225 A1 | 2/2017 | Uplenchwar et al. | |
| 2017/0064707 A1* | 3/2017 | Xiao | H04W 72/0446 |
| 2017/0094611 A1 | 3/2017 | Carter et al. | |
| 2017/0150384 A1* | 5/2017 | Rune | H04W 24/10 |

FOREIGN PATENT DOCUMENTS

| | | |
|---|---|---|
| CN | 102 271 414 | 12/2011 |
| CN | 104684052 A | 6/2015 |
| EP | 1322048 | 6/2003 |
| EP | 1718090 | 11/2006 |
| EP | 1895801 | 3/2008 |
| EP | 2166714 | 3/2010 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2566261 | 3/2013 |
| EP | 2018781 | 4/2013 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/079913 | 6/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/087392 | 6/2014 |
| WO | WO2014/087393 | 6/2014 |

OTHER PUBLICATIONS

U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
IPO Mar. 27, 2017 Intellectual Property Office Combined Search and Examination Report under Sections 17 and 18(3) from Application No. GB1703805.0; 5 pages.
PRC Apr. 7, 2017 SIPO First Office Action from Chinese Application No. 201280058324.X; 14 pages (English translation only).
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sofia Antipolis Cedex—France, May 2011; 12 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 123 401 V12.70 (Jan. 2015) Technical Specification:" LTE; General Packet Radio Service (GPRS) enhancements for Evolved Universal Terrestrial Radio Access Network (E-UTRAN) access (EGPP TS 23.401 version 12.7.0 Release 12), Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

(56) References Cited

OTHER PUBLICATIONS

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS 125 367 V9.4.0," Universal Mobile Telecommunications System (UMTS); Mobility procedures for Home Node B (HNB); Overall description; Stage 2 (3GPP T525.367 version 9.4.0 Release 9), European Telecommunications Standards Institute, 650 Route des Lucioles, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 125 469 v11.2.0," Universal Mobile Telecommunications System (UMTS); UTRAN Iuh interface Home Node B (HNB); Application Part (HNBAP) signalling (3GPP TS25.469 version 11.2.0 Release 11), European Telecommunications Standards Institute, 650 Route des Lucioles, F-06921 Sophia Antipolis Cedex, France, Apr. 2013, 78 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12)," [Relevant Sections 3, 4, 8 and 8 only], ETSI, 650 Route des Lucioles, F-06921, Sophia Antipolis Cedex-France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.

"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.

"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standard Institute, 650 Route des Lucioles F-06921 Sophia Antipolis Cedex—France, Oct. 2015 Section 1 thru 9 only; 252 pages.

"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.

"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.

"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.

"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.

"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.

"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.

"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.

"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sofia Antipolis Cedex—France, Nov. 2015; 40 pages.

"ETSI TS 136 321 V12.7.0 (Oct. 2015) Technical Specificaton: LTE; Evolved Universal Terrestrial Radio Access (U-UTRA); Medium Access Control (MAC) protocol specification (3GPP TS 36.321 version 12.7.0 Release 12);" ETSI, European Telecommu-

(56) References Cited

OTHER PUBLICATIONS nications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.

"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

(56) References Cited

OTHER PUBLICATIONS

"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.

"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.

3GPP Draft R3-071432, Telecom Italia, et al., "Self-optimization use case: self-tuning of cell reselection parameters for load balancing," 3rd Generation Partnership Project (3GPP), Mobile Competence Centre; 650; Route Des Lucioles; F-06921 Sophia-Antipolis; Aug. 2007; XP050162260.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.

Adrangi, F., et al., "Chargeable User Identity," Network Working Group RFC 4372, Jan. 2006, 10 pages.

Andrews, Matthew, et al., "Optimal Utility Based Multi-User Throughput Allocation Subject to Throughput Constraints," IEEE INFOCOM 2005, Mar. 13-17, 2005, Miami, FL; 10 pages.

Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.

Basir, Adnan, "3GPP Long Term Evolution (LTE), ICIC and eICIC," posted Jun. 11, 2012; 5 pages; http://4g-lte-world-blogspot.com/2012/06/icic-and-eicic.html.

Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.

"Bisection Method," Wikipedia, the free encyclopedia, Aug. 26, 2015; 5 pages.

"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.

"Broadband Forum Technical Report: TR-069 CPE WAN Management Protocol," Issue: 1, Amendment 4, Issue Date: Jul. 2011 Protocol Version 1.3; © The Broadband Forum; 190 pages.

"Broadband Forum Technical Report: TR-069 CPE WAN Management Protocol," Issue: 1, Amendment 5, Issue Date: Nov. 2013 CWMP Version 1.4; © The Broadband Forum; 228 pages.

"Broadband Forum Technical Report: TR-196 Frmto Access Point Service Data Model," Issue: 2, Issue Date: Nov. 2011; 46 pages.

Calhoun, P., "Diameter Base Protocol," Network Working Group RFC 3488, Sep. 2003; 147 pages.

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.

(56) References Cited

OTHER PUBLICATIONS

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.

(56) References Cited

OTHER PUBLICATIONS

Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.org/wiki/RADIUS.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
EPO Jul. 29, 2014 Extended Search Report from European Application Serial No. EP13195673, 12 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.w
PCT Mar. 17, 2014 International Search Report and Written Opinion from International Application Serial No. PCT/IL2013/000086, 12 pages.
PCT Jun. 16, 2014 International Search Report and Written Opinion of the International Searching Authority for International Application Serial No. PCT/IL2013/000085.
PCT-Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE;

(56) References Cited

OTHER PUBLICATIONS

Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Madan, Ritesh, et al., "Fast Algorithms for Resource Allocation in Wireless Cellular Networks," IEEE/ACM Transactions on Networking, vol. 18, No. 3, Jun. 2010; 12 pages.
Park, Jeongho, et al., "Interference Level Control in Mobile WiMAX Uplink System," 2009 IEEE Mobile WiMAX Symposium, Jul. 9-10, 2009; 5 pages.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
Ruby, Ruksana, et al., "Uplink Scheduling Solution for Enhancing Throughput and Fairness in Relayed Long-Term Evolution Networks," IET Communications 2014, vol. 8, Issue 6, Apr. 2014; 13 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document No. 3GPPEVOLUTIONWP; Jul. 2007; 27 pages.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
Nokia Siemens Networks et al: "Enhanced ICIC considerations for HetNet scenarios", 3GPP Draft; R1-103822_EICIC_OVERVIEW, 3rd Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010-Jul. 2, 2010, Jun. 22, 2010 (Jun. 22, 2010), XP050598481, [retrieved on Jun. 22, 2010] Section 3, 4 pages.
QUALCOMM Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, no. Jacksonville, USA; Nov. 15, 2010, Nov. 9, 2010 (Nov. 9, 2010), XP050492195, [retrieved on Nov. 9, 2010] Section 16.X.2, 5 pages.
"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
U.S. Appl. No. 15/071,724, filed Mar. 16, 2016, entitled "Power Setting," Inventor: Pankaj Uplenchwar, et al.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Febuary 8, 2016, entitled "Mitigation of Uplink Interference Within Heterogeneous Wireless Communications Networks," Inventor: Pankaj Uplenchwar, et al.
U.S. Appl. No. 14/479,343, filed Sep. 7, 2014, entitled "Operation of Base Station in a Cellular Communications Network," Inventor: Simon Burley.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.

(56) References Cited

OTHER PUBLICATIONS

U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/803,475, filed Jul. 20, 2015, entitled "System and Method for Decoupling Long Term Evolution Media Access Control Scheduling From Subframe Rate Procedures," Inventors: Oliver James Bull et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.

* cited by examiner

SYSTEM AND METHOD TO PROVIDE SMALL CELL POWER CONTROL AND LOAD BALANCING FOR HIGH MOBILITY USER EQUIPMENT IN A NETWORK ENVIRONMENT

TECHNICAL FIELD

This disclosure relates in general to the field of communications and, more particularly, to a system and method to provide small cell power control and load balancing for high mobility user equipment (UE) in a network environment.

BACKGROUND

Networking architectures have grown increasingly complex in communications environments, particularly mobile wireless environments. Mobile communication networks have grown substantially in subscriber base as end users become increasingly connected to mobile wireless environments. In particular, small cell deployments can be provided such that a number of small cell radios can be deployed in an area such that their coverage areas can be overlaid by a number of macro cell radios. In general, small cell radios can provide access to a service provider's network in areas when connectivity to the service provider's macro cell network may be limited due to interference, subscriber density or the like. As the number of mobile subscribers increases, efficient management of communication resources becomes more critical for deployments including small cell radios having coverage areas overlaid by macro cell radio.

In current deployments, setting a maximum transmit power for small cell radios and providing load balancing between macro and small cell radios is based largely on interference considerations and do not consider impacts to high mobility UEs. High mobility UEs are UEs can have a high rate of location change in comparison to other UEs for a given deployment, such as, for example, subscribers/UEs on a train, in a car, or the like for a given area. Basing small cell maximum power control and load balancing decisions on interference considerations alone can lead to suboptimal capacity for a communication network such that the number of high mobility UEs that can be served by small cell radios in a given area will be limited. Accordingly, there are significant challenges in providing small cell maximum transmit power control and load balancing for high mobility UEs in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
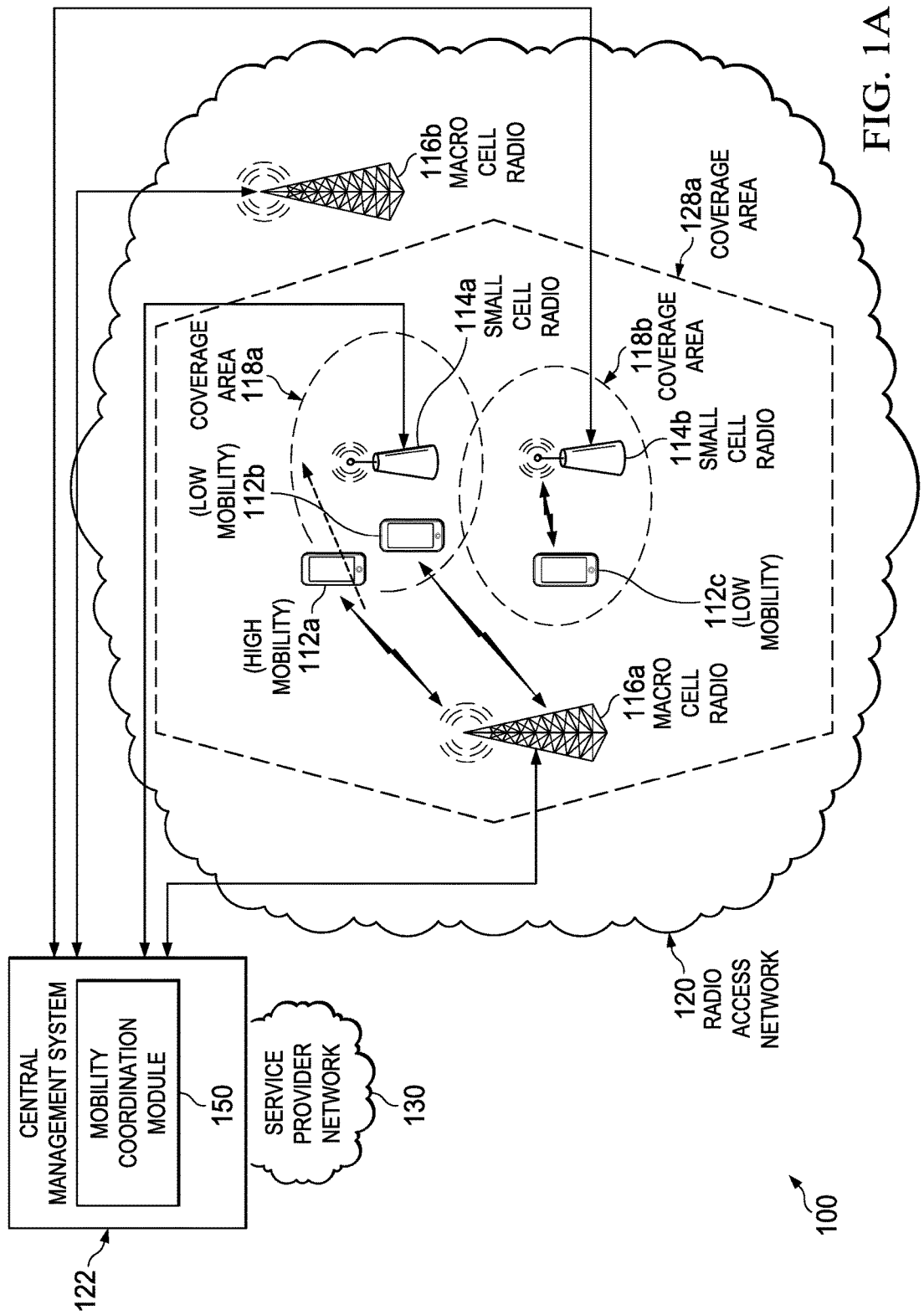
FIG. 1A is a simplified block diagram illustrating a communication system to facilitate providing small cell maximum transmit power control and load balancing for high mobility user equipment (UE) in a network environment according to one embodiment of the present disclosure.

A method is provided in one example embodiment and may include generating feedback information by a small cell radio and a macro cell radio; setting a high mobility handover threshold for the macro cell radio based, at least in part, on the feedback information, wherein the high mobility handover threshold is used to trigger handover of one or more high mobility user equipment (UE) associated with the macro cell radio to the small cell radio; and setting a maximum downlink transmit power for the small cell radio based, at least in part, on the feedback information and the high mobility handover threshold. In one case, the method can further include receiving the feedback information by a central management system, wherein the central management system performs setting the high mobility handover threshold for the macro cell radio and setting the maximum downlink transmit power for the small cell radio.

In at least one instance setting the high mobility handover threshold for the macro cell radio can include evaluating a rate of undesirable handovers to the small cell radio of the one or more high mobility UE associated with the macro cell radio in relation to a maximum rate of undesirable handovers and a minimum rate of undesirable handovers for the macro cell radio; evaluating a load of the macro cell radio in relation to a maximum load and a minimum load for the macro cell radio; and setting the high mobility handover threshold for the macro cell radio to reduce the rate of undesirable handovers below the maximum rate of undesirable handovers when the load of the macro cell radio is below the maximum load for the macro cell radio.

In at least one instance setting the maximum downlink transmit power for the small cell radio can include evaluating the high mobility handover threshold for the macro cell radio in relation to a maximum Signal-to-Interference-Plus-Noise Ratio (SINR) and a minimum SINR expected for one or more UE associated with the macro cell radio; evaluating a Radio Link Failure (RLF) failure rate for one or more low mobility UE associated with the small cell radio in relation to a maximum RLF failure rate for the small cell radio; and setting the maximum downlink transmit power for the small cell radio to limit interference toward the one or more UE associated with the macro cell radio and to maintain the RLF failure rate of one or more low mobility UE associated with the small cell radio below the maximum RLF failure rate. In some cases, if the maximum downlink transmit power for the small cell radio is reduced, setting the high mobility handover threshold for the macro cell radio can include reducing the high mobility handover threshold in proportion to an amount that the maximum downlink transmit power for the small cell radio is reduced.

In one instance, feedback information generated by the macro cell radio can include one or more of: mobility information for one or more UE associated with the macro cell radio; radio link failure (RLF) information for one or more UE associated with the macro cell radio; measurement report information for one or more UE associated with the macro cell radio; loading statistics for the macro cell radio; a rate of undesirable handovers of one or more UE associated with the macro cell radio; a transmit power of the macro cell radio; the high mobility handover threshold for the macro cell radio; and a Fractional Frequency Reuse (FFR) pattern for the macro cell radio. In one case, mobility information for a particular UE can include mobility history information for the particular UE, wherein the mobility history information includes a list one or more cell radios to which the particular UE has been previously connected and a time of stay associated with each of the one or more cell radios contained in the list.

In one instance, feedback information generated by the small cell radio can include one or more of: mobility information for one or more UE associated with the small cell radio; radio link failure (RLF) information for one or more UE associated with the small cell radio; measurement report information for one or more UE associated with the small cell radio; a Radio Link Failure (RLF) failure rate for one or more UE associated with the small cell radio; a maximum downlink transmit power of the small cell radio; and a Fractional Frequency Reuse (FFR) pattern for the small cell radio.

EXAMPLE EMBODIMENTS

Figure 1B:
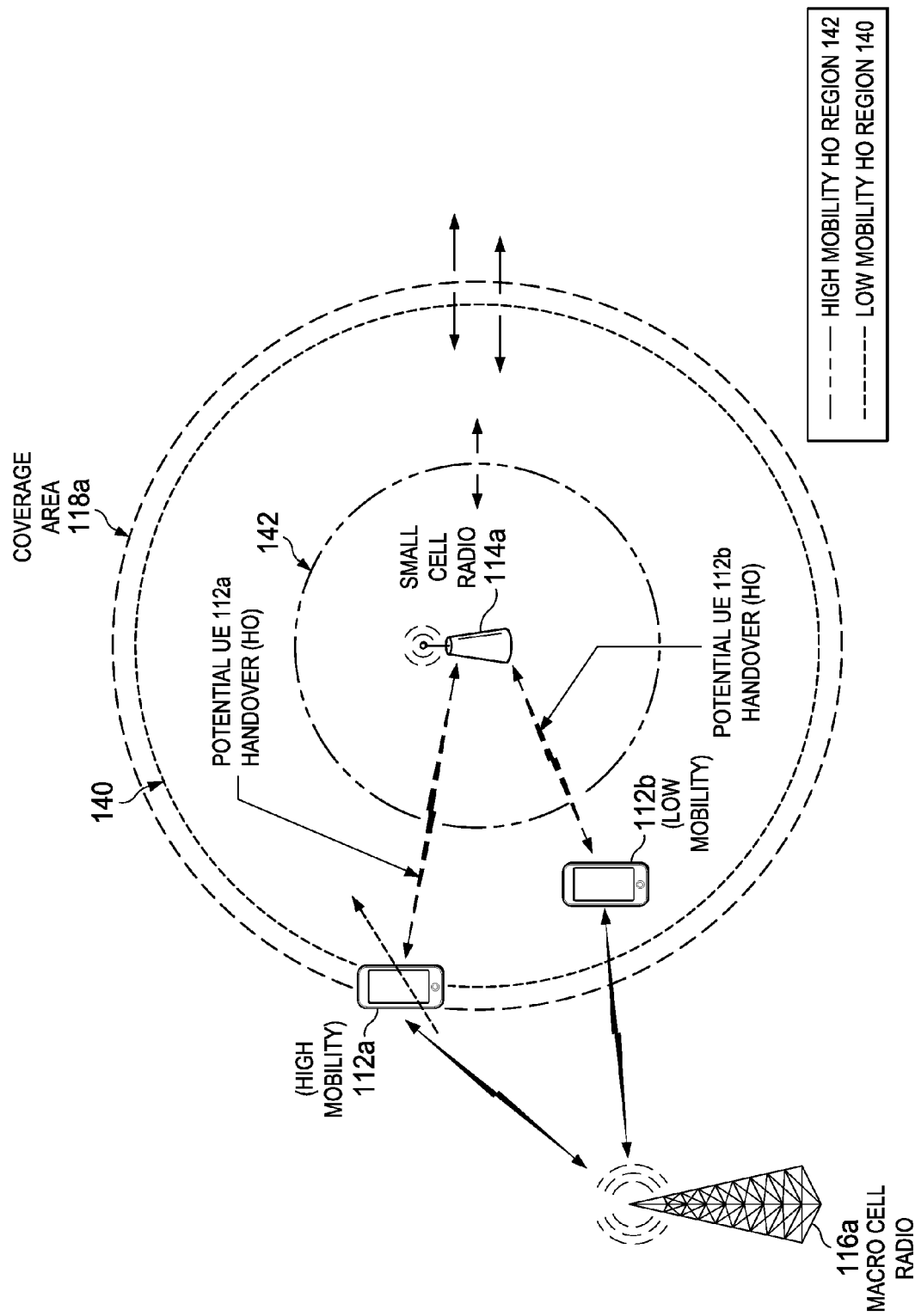
FIG. 1B is a simplified block diagram illustrating example details that can be associated with the communication system in accordance with one potential embodiment.

Referring to FIG. 1A, FIG. 1A is a simplified block diagram illustrating a communication system 100 to facilitate providing small cell maximum (max) power control and load balancing for high mobility UEs in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally. FIG. 1B is a simplified block diagram illustrating various example details that can be associated with communication system 100 and will be discussed in conjunction with FIG. 1A.

The example architecture of FIG. 1A can include users operating user equipment (UE) 112a-112c, one or more small cell radio(s) 114a-114b, one or more macro cell radio(s) 116a-116b, a radio access network (RAN) 120, a central management system 122 and a service provider network 130. Central management system 122 can include a mobility coordination module 150. Each of small cell radio 114a-114b and each macro cell radio 116a-116b can be logically interconnected connected with central management system 122 and service provider network 130. [Note interconnections between each of small radio 114a-114b, each of macro cell radio 116a-116b and service provider network 130 are not illustrated in FIG. 1A in order to highlight other features of communication system 100.]

As referred to herein in this Specification, a 'small cell radio' (e.g., small cell radio 114a, 114b) can be referred to interchangeably as a 'small cell', a 'emtocell' or a 'pico cell'. As referred to herein in this Specification, a 'macro cell radio' (e.g., macro cell radio 116a, 116b) can be referred to interchangeably as a 'macro cell', a 'macro radio' or a 'macro'.

Each respective small cell radio 114a-114b can have a respective small cell radio coverage area 118a-118b, as indicated by the respective dashed-line circle surrounding each respective small cell radio 114a-114b. Macro cell radio 116a can have a respective macro cell radio coverage area 128a, as indicated by the respective dashed-line hexagon surrounding macro cell radio 116a. Macro cell radio 116b can also have a respective macro cell radio coverage area, however this is not shown in FIG. 1A in order to discuss other features of communication system 100. In general, the coverage area of a cell radio (e.g., small or macro) can be dependent on the maximum (max) downlink transmit power set for the cell radio. For example, as the max downlink transmit power for a small cell radio is increased, the coverage area of the small cell radio increases proportionately depending on interference (e.g., buildings, other cell radios, etc.) that may be present. Conversely, as the max downlink transmit power for a small cell radio is decreased, the coverage area of the small cell radio decreases proportionately depending on interference that may be present. As referred to herein in this Specification, the terms 'maximum downlink transmit power' and 'maximum transmit power' can be used interchangeably.

In various embodiments, the macro cell radio coverage area for a given macro cell radio (e.g., coverage area 128a for macro cell radio 116a) can overlap, in whole or in part, with small cell radio coverage areas for one or more small cell radios (e.g., respective coverage areas for respective small cell radio 114a, 114b) such that the small cell radios can be considered to be under the coverage area for the macro cell radio such that the macro cell radio can be considered to be neighboring the small cell radios. It should be understood that the coverage areas shown in FIG. 1A are provided for illustrative purposes only, and are not meant to limit the broad scope of the teachings of the present disclosure. Any other coverage areas (e.g., coverage area size/range) can be provided by cell radios within the scope of the present disclosure. Further, it should be understood that UEs can be distributed anywhere within the coverage areas of small cell radios 114a-114b or macro cell radios 116a-116b within the scope of the teachings of the present disclosure. The locations of the UEs are provided for illustrative purposes only.

Central management system 122 can include mobility coordination module 150, which can, in various embodiments provide, small cell power coordination operations to facilitate small cell radio 114a-114b transmit power control and setting high and low mobility UE threshold(s) to facilitate load balancing for high mobility UEs and low mobility UEs between small cell radios 114a-114b and macro cell radios 116a-116b. In various embodiments, central management system 122 can be deployed as any central management entity, such as, for example, an Operations, Administration and Maintenance (OAM) entity, a Radio Management System (RMS), a Radio Resource Manager (RRM), a Self-Organizing Network (SON) management system, combinations thereof or the like. In certain embodiments, an RMS (e.g., a small cell management system) can be used in conjunction with small cell deployments, for example, to configure small cell radios 114a-114b according to a particular communications protocol (e.g., Technical Report (TR) 069) and data model (e.g., TR-196 version 2).

In some embodiments, a SON management system (e.g., central management system) can have visibility of, and/or may interface with one or more parallel networks such as, for example, a macro cell network, a small cell network, a wireless local area network (WLAN), etc. and can be used to coordinate small cell transmit power control and/or load balancing for UE between macro and small cell radios for a deployment. Central management system 122 can be configured to maintain a system-wide view of communication system 100 and can therefore intelligently provision small cell transmit power among different communication networks in the communication system. Accordingly, central management system 122 can be configured to interface with any element or node of communication system 100 via one or more logical interfaces. In various embodiments, central management system 122 can be deployed within service provider network 130 or within a cloud-based service (e.g., in a centralized SON (cSON) architecture), can be distributed throughout a service network for a particular deployment, such as, for example, distributed throughout one or more small cell radios for an small cell deployment (e.g., in a distributed SON (dSON) architecture) and/or can be deployed in a hybrid SON (hSON) architecture in which a mixture of a central management system and one or more distributed management systems can be deployed for a given architecture.

For FIGS. 1A-1B, UE 112a can be considered to be a high mobility UE served by macro cell radio 116a, as indicated by the dashed line, which can generally represent a path of location change for UE 112a. UE 112b can be considered to be a low mobility UE served by macro cell radio 116a. UE 112c can be considered to be low mobility UE served by small cell radio 114b. In one embodiment, a UE can be classified as a high mobility UE if the UE has a rate of location change that is higher in comparison to other UEs served by a given cell radio (e.g., macro or small cell)) by a location rate change threshold. In at least one embodiment, a location rate change threshold could be set to a percentage, ratio, percent difference or other similar metric that could be used to compare the rate of location change for UEs served by a cell radio. In another embodiment, a UE can be classified as a high mobility UE if the UE has a rate of location change that is above a certain high mobility threshold level. Similarly, in various embodiments, a UE can be classified as a low mobility UE if it has a rate of location change that is lower in comparison to any UEs classified as high mobility UEs by a location rate change threshold and/or if the UE has a rate of location change that is below a certain low mobility threshold level.

In various embodiments, a rate of location change of UEs served by a given cell radio can be calculated by the cell radio using one or more location indicators, which can include, but not be limited to, Global Positioning System (GPS) indicators, signal strength Indicators, User Location Information (ULI) based indicators as defined by 3GPP standards such as Tracking Area Identity (TAI), Routing Area Identity (RAI), Location Area Identity (LAI), combinations thereof or the like. While the present disclosure addresses embodiments in which small cell transmit power control and load balancing between small and macro cells can be provided for high mobility UEs, establishing other criteria that can be used for classifying UEs as high mobility UEs is not outside its broad and expansive scope. It is anticipated that this disclosure would indeed be applicable to establishing criteria that can be used for classifying UEs as high mobility or low mobility UEs; however, for embodiments discussed herein, it is assumed that one or more of each macro cell radio 116a-116b and/or each of small cell radio 114a-114b is configured with the ability to classify UEs served thereby as high or low mobility UEs using one or more criteria.

However, it should be understood that there may be cases in which a cell radio may be unable to classify UEs as high mobility or low mobility. For example, in some cases, UE the rate location changes of UEs served by a macro cell radio may be relatively the same for all the UEs such that the macro cell radio may be unable to determine whether the UEs are high mobility or low mobility. In various embodiments, both idle mode and connected mode UE can be considered to be high or low mobility within the coverage area of a given cell radio.

Before detailing some of the operational aspects of FIGS. 1A and 1B, it is important to understand common characteristics of small cell transmit power is as typically set in current communication network deployments. The following foundation is offered earnestly for teaching purposes only and, therefore should not be construed in any way to limit the broad teachings of the present disclosure.

In general, SON deployments provide for dynamic mobility configurations which can ensure mobility robustness such that capacity and throughput for a communication system can be optimized via Mobility Load Balancing (MLB) and Mobility robustness optimization (MRO). MLB as prescribed by 3GPP standards Release 9 is a function which provides for offloading traffic from a cell experiencing congestion to another cell having an overlapping coverage area that has spare capacity. In some cases, capacity limitations can be addressed through 'cell splitting', which is the concept of adding more cells in the same area such that each cell serves fewer UEs. MLB, also referred to generally as load balancing, differs from cell splitting in that load balancing typically refers to optimizing the association of UEs to cells for a given distribution of cells in a geographical area. MRO as prescribed by 3GPP standards is a technique that provides for the automatic detection and correction of errors that may be present for a mobility configuration. 3GPP standards Release 9 focused on errors that caused Radio Link Failure (RLF) due to handovers being performed too early or too late or to an incorrect cell.

For current deployments in which macro and small cell coverage areas overlap maximum transmit power for small cell radios is typically set based on network listen techniques, UE measurements or the like and is primarily focused on interference considerations. However, to ensure mobility robustness based on techniques provided for current deployments can lead to small cells' transmit power being set very conservatively, which can drastically reduce system capacity.

Further, MRO as prescribed by 3GPP standards is typically focused only on changing cell offsets and the time to trigger for UE measurements. Such techniques can typically only change the coverage boundary of small cell radios by about 6 decibels (dB) or so to ensure reliable downlink channels for UE attached to weaker cells. Thus, for MRO used in current deployments, the boundary (e.g., coverage area handover boundary, or more generally, handover region) between two cells does not change; high mobility UEs which remain attached to a macro cell can typically attain only a very low SINR; and/or high mobility UEs may see RLF due to small cell interference until small cell transmit power is lowered.

Further, current deployments do not consider setting of small cell transmit power based on mobility considerations and, in combination, setting handover thresholds to ensure mobility robustness.

In accordance with at least one embodiment, the example architecture of communication system 100 can overcome these shortcomings (and others) by providing for the ability to dynamically optimize the maximum (max) transmit power for small radios 114a-114b in combination with providing for the load balancing high mobility UEs between macro cell radios 116a-116b and small cell radios 114a-114b through the use of high mobility handover (HO) threshold(s) that can be dynamically optimized for each macro cell radio 116a-116b across each small cell radio neighboring of each macro cell radio. A macro cell radio can have a different handover threshold (e.g., high and low mobility UE HO threshold) for each small cell radio neighboring the macro cell radio. Optimizations for the low mobility HO threshold(s) for a given macro cell radio, as discussed in further detail herein, can depend on whether or not Fractional Frequency Reuse (FFR) is enabled at the macro cell radio and whether or not each small cell radio neighboring the macro cell radio has awareness of the FFR pattern used by the macro cell radio.

According to embodiments discussed herein, the determination of which cell (macro or small cell) is to serve a given UE can be a function of: (a) whether the UE is classified as high or low mobility, (b) the handover (HO) threshold(s) for high and low mobility depending on the UE classification and (c) signal strengths of serving and neighbor cells as measured by the UE. A parameter '$\Delta_{HIGH}(m_i, c_i)$' can be used to represent a high mobility HO threshold for a given macro cell radio $m_i$ such that the high mobility UE HO threshold $\Delta_{HIGH}(m_i, c_i)$, in decibels (dB), represents the threshold for which handover of a high mobility UE served by the macro cell radio $m_i$ can be triggered towards a given small cell radio $c_i$. In one embodiment, handover of a high mobility UE from a macro cell $m_i$ to a small cell $c_i$ can be triggered when the Layer 3 (L3) filtered Reference Signal Received Power (RSRP) that the UE receives from the macro cell $m_i$ is less than the RSRP that the UE receives from the small cell $c_i$ plus $\Delta_{HIGH}(m_i, c_i)$ (e.g., a high mobility UE HO is triggered when $RSRP(m_i) < RSRP(c_i) - \Delta_{HIGH}(m_i, c_i)$ for a given UE served by macro cell radio m). As referred to herein in this Specification, the term 'high mobility UE HO threshold' can be used interchangeably with the term 'high mobility HO threshold'.

A parameter '$\Delta_{LOW}(m_i, c_i)$' can be used to represent a low mobility HO threshold for a given macro cell radio $m_i$ such that the high mobility HO threshold $\Delta_{LOW}(m_i, c_i)$, in decibels (dB), represents the threshold for which handover of a high mobility UE served by the macro cell radio $m_i$ can be triggered towards a given small cell radio $c_i$. In one embodiment, handover of a low mobility UE from a macro cell $m_i$ to a small cell $c_i$ can be triggered when the L3 filtered Reference Signal Received Power (RSRP) that the UE receives from the macro cell $m_i$ is less than the RSRP that the UE receives from the small cell $c_i$ minus $\Delta_{LOW}(m_i, c_i)$ (e.g., high mobility HO is triggered when $RSRP(m_i) < RSRP(c_i) - \Delta_{LOW}(m_i, c_i)$ for a given UE served by macro cell radio $m_i$). As referred to herein in this Specification, the term 'low mobility UE HO threshold' can be used interchangeably with the term 'low mobility HO threshold'.

In accordance with various embodiments, a maximum power constraint for can be calculated for each of a given small cell radio $c_i$. A parameter '$M(c_i)$' can represent the set of neighboring macro cells for a given small cell radio $c_i$. In various embodiments, a macro cell radio can be determined to be a neighbor of a small cell radio using network listen techniques at the small cell radio and/or by using measurement reports received from UE served by the small cell radio. A parameter '$P(m_i, c_i)$' can represent a maximum power constraint at small cell radio $c_i$ based on considerations with respect to each of a macro cell radio $m_i$ such that $m_i \in M(c_i)$. The maximum power constraint $P(m_i, c_i)$ can be used to set the actual maximum transmit power for a small cell radio $c_i$, which can be represented using a parameter '$P(c_i)$'. In at least one embodiment, the maximum transmit power for a small cell radio $c_i$ can be set such that $P(c_i) = \min_{m \in M(c_i)} P(m_i, c_i)$. In various embodiments, maximum transmit power can be set within a range from approximately −10 decibel-milliwatts (dBm) to approximately 20 dBm.

Signal-to-interference-plus-Noise Ratio (SINR) is used to describe or quantify signal quality for downlink transmissions to UE (e.g., from a serving cell radio to a UE) and/or uplink transmissions from UE (e.g., from a given UE to its serving cell radio). A parameter '$\gamma$' can be used to represent SINR for the present disclosure. Generally, SINR for a given UE can be determined from one or more signal strength indicators. In some embodiments, for example, SINR for a given UE (e.g., any of UE 112a-112c) can be determined or estimated based on one or more of: a Reference Signal Received Quality (RSRQ) as measured by the UE for the Evolved-Universal Terrestrial Radio Access (E-UTRA); a downlink channel quality indicator (CQI) reported by the UE through one or more measurement reports; RSRP and/or the received signal strength for a transmission divided by the total interference in a cell. Typically, E-UTRA is described in reference to the air-interface for LTE radio access.

As defined in 3GPP TS 36.214, RSRP is the linear average over the power contributions of resource elements for Physical Resource Blocks (PRBs or, more generally, RBs) that carry cell-specific reference signals (CRS) within a considered measurement frequency bandwidth. RSRQ is defined as the ratio of the number (N) of RBs of the E-UTRA carrier received signal strength indicator (RSSI) measurement bandwidth (e.g., system bandwidth) multiplied by the RSRP divided by the RSSI, generally expressed as 'N*RSRP/RSSI'. In general, a given UE can measure/determine signal strength information such as, for example, RSRP and/or RSRQ for a serving cell and/or non-serving cells (e.g., neighboring cells), if enabled and can send results of the measurements in one or more measurement reports to its serving cell. In certain embodiments, RSRP and/or RSRQ measurements for neighboring cells can be enabled for UE 112a-112c or any other UE described herein.

An RB as defined in 3GPP technical specification (TS) 36.211, is typically represented by a number of resource elements, each of which can be allocated within a symbol, for each of a particular subcarrier (e.g., frequency) that can be associated with a particular UE. An RB can generally be referred to as a 'slot' spanning 0.5 milliseconds (msec) of a 1 msec subframe. The smallest unit of an RB is a resource element, which represents one subcarrier by one symbol. Thus, a RB can be schematically represented as spanning a portion of frequencies of system bandwidth (e.g., depending on the number of subcarriers in the RB) across a span of time (e.g., 0.5 msec) for each symbol included in the RB. For 4G/LTE, the number of subcarriers for an RB is 12, each spanning a 15 kilohertz (KHz) subcarrier bandwidth, thus each RB represents a 180 KHz portion of system bandwidth. As system bandwidth can vary, such as, for example, between 1.4 megahertz (MHz) and 20 MHz, the number of available RBs that can be scheduled or allocated across UEs can vary, respectively between 1 and 100 per 1 msec Transmission Time Interval (e.g., TTI). Typically, a 10 MHz bandwidth corresponds to 50 available RBs that can be allocated to UEs served by a particular cell. It should be understood that RBs can be uplink RBs or downlink RBs, depending on the device transmitting the RBs.

In the downlink, downlink channels associated with downlink transmissions to UE served by a cell radio can include the Physical Downlink Shared Channel (PDSCH), which carries data transport blocks (e.g., RBs) to the UE served by the cell radio, and the Physical Downlink Control Channel (PDCCH), which carries control and signaling information to the UE. Uplink channels are those channels associated with UE uplink transmissions of resources and/or control information to a serving cell radio.

In accordance with various embodiments, the architecture of communication system 100 can provide for the joint optimization of the maximum transmit power for each small cell radio 114a-114b and the high mobility HO threshold(s) for each macro cell radio 116a-116b. By joint optimization, it is meant that each of the maximum transmit power for each small cell radio 114a-114b and the high mobility HO threshold for each macro cell radio 116a-116b can be set in combination in order to increase overall capacity for the communication system.

In one embodiment, the architecture of communication system 100 can provide for the joint optimization of a transmit power for each small cell radio 114a-114b and a high mobility HO threshold for each macro cell radio 116a-116b when Fractional Frequency Reuse (FFR) is enabled for small cell radios 114a-114b. In another embodiment, the architecture of communication system 100 can provide for the joint optimization of a transmit power for each small cell radio 114a-114b and a high mobility HO threshold for each macro cell radio 116a-116b, when FFR is not enabled for small cell radios 114a-114b. In one embodiment, optimizations for the low mobility HO threshold(s) for a given macro cell radio can depend on whether or not FFR is enabled at the macro cell radio and whether or not each small cell radio neighboring the macro cell radio has awareness of the FFR pattern used by the macro cell radio.

For LTE, 3GPP specifications define different interference mitigation schemes such as, for example, interference reduction and Inter-cell Interference Coordination (ICIC). Interference reduction is typically associated with optimizing coverage and capacity for a network. ICIC is typically associated with the coordination of radio resources to mitigate inter-cell interference. In the frequency domain, ICIC is often used to manage the allocation of RBs between cells in order to coordinate the use of frequency domain resources.

In efforts to increase system capacity and spectral efficiency, 3GPP standards have introduced several techniques to implement Inter-cell Interference Coordination (ICIC) in cellular networks. 3GPP Release 8 and Release 9 introduced frequency domain ICIC techniques such as FFR to enable ICIC in a cellular network in order to mitigate interference between neighboring cell radios. Typically, FFR is implemented in a homogenous network (e.g., to mitigate interference only between small cell radios or only between macro cell radios). A basic tenet of FFR is to partition a cell radio's bandwidth according to an FFR pattern for resource (e.g., RB) allocation so that cell edge UEs served by neighboring cell radios do not interfere with each other and that the interference received by (and created by) cell interior UEs is reduced. Generally, a cell edge UE is a UE that is served near the edge of the coverage area of a given cell radio and a cell interior UE is a UE that is served near the interior of the coverage area of a given cell radio. An aggregation level can be set for FFR implemented for a deployment. The aggregation level can indicate the number of partitions into which each cell radio's bandwidth can be divided. According a given aggregation level, an FFR pattern can be used to indicate corresponding frequencies at which partitions can occur between high power and low power RBs that can be served by a given cell radio.

The use of FFR to mitigate interference for cellular network represents a tradeoff between providing improvements in throughput rate and coverage area for cell edge UE while balancing the sum total network throughput rate and spectral efficiency for all UEs served in the cellular network. In general, the sum total network throughput rate for a cellular network can be referred to as the overall 'utility' for the network. In general, an Energy Per Resource Element (EPRE) can be associated with each resource element for an RB. A small cell radio can use varying PDSCH EPRE for transmitting low power and high power downlink RBs. Whether an RB is transmitted at a low power or high power can be based on, for example, interference considerations, which can vary depending on the interference coordination scheme (e.g., FFR aggregation level, FFR pattern, etc.) for a given deployment.

Referring to FIG. 1B, FIG. 1B is a simplified block diagram illustrating example details that can be associated with communication system 100 in accordance with one potential embodiment. FIG. 1B includes UE 112a and 112b, small cell radio 114a and macro cell radio 116a. Coverage area 118a for small cell 114a is also illustrated in FIG. 1B. Other example details illustrated in FIG. 1A are not shown in FIG. 1B in order to discuss other example details that can be associated with communication system 100. For example, although FIG. 1B is discussed with reference to small cell radio 114a, it should be understood that the example details discussed for small cell radio 114a can be equally applicable to small cell radio 114b.

The coverage area of a cell radio (e.g., coverage area 118a of small cell radio 114a) can be based on the maximum transmit power set for the cell radio. In accordance with one embodiment, a high mobility handover (HO) threshold and a low mobility HO threshold can be set for macro cell radio 116a and can be used, at least in part, to determine when to trigger a handover of UE served by macro cell radio 116a toward small cell radio 114a. In one embodiment, the high mobility HO threshold set for macro cell radio 116a can correspond to a high mobility HO region 142 relative to small cell radio 114a and the low mobility HO threshold set for macro cell radio 116a can correspond to a low mobility HO region 140 relative to small cell radio 114a.

The low mobility HO region 140 can represent a geographic region within coverage area 118a in which the signal strength from the small cell radio 114a toward low mobility UE can trigger handover of the low mobility UE served by macro cell radio 116a towards the small cell radio 114a. The high mobility HO region 142 can represent a geographic region within coverage area 118 in which the signal strength from the small cell radio 114a can trigger handover of high mobility UE served by macro cell radio 116a toward small cell radio 114a.

In one embodiment, the overall coverage area for a given small cell radio, which can be determined based on the maximum transmit power set for the small cell radio can be used to set the low mobility HO threshold for a neighboring macro cell radio such that the small cell coverage area and the low mobility HO region for the small cell radio are approximately equal. However, in other embodiments as discussed herein, the low mobility HO region can be adjusted depending on whether FFR is implemented by a neighboring macro cell radio and whether a small cell radio is aware of the FFR pattern implemented by the neighboring macro cell radio.

It should be understood that the low mobility HO region 140 can represent a HO region within coverage area 118 inclusive of the high mobility HO region 142. For example, the low mobility HO region 140 can represent an area within the coverage area 118a of small cell radio 114a in which the signal strength of the small cell radio, as measured by low mobility UE 112b served by macro cell radio 116a, can be used to trigger a potential handover towards the small cell radio 114a based on a given low mobility HO threshold $\Delta_{LOW}(m_{116a}, c_{114a})$ set for macro cell radio 116a with respect to the small cell radio 114a. The high mobility HO region 142 can represent an area within the coverage area 118a of small cell radio 114a in which the signal strength of the small cell radio, as measured by high mobility UE 112a served by macro cell radio 116a, can be used to trigger a potential handover towards the small cell radio 114a based on a given high mobility HO threshold $\Delta_{HIGH}(m_{116a}, c_{114a})$ set for macro cell radio 116a with respect to the small cell radio 114a.

Further discussions of the high mobility HO threshold(s) and the low mobility HO threshold(s) that can be set for a macro cell radio(s) and the maximum transmit power that can be set for small cell radio(s) are provided in further detail below. Reference to FIGS. 1A and 1B will be referenced for the remainder of the present disclosure to discuss various features that may be provided by the architecture of communication system 100.

As noted above, the architecture of communication system 100 can, in various embodiments, provide for the joint optimization of the maximum transmit power for each small cell radio 114a-114b and the high mobility HO threshold for each macro cell radio 116a-116b for cases in which FFR is enabled for small cell radios 114a-114b and for cases in which FFR is not enabled for small cell radios 114a-114b. In certain embodiments, the low mobility HO threshold can be optimized based on whether FFR is enabled or not enabled for macro cell radios 116a-116b and whether small cell radios 114a-114b are made aware of the FFR pattern of the macro cell radios 116a-116b. In various embodiments, maximum transmit power(s), high mobility HO threshold(s) and low mobility HO threshold(s) can be considered mobility coordination parameters that can be set by central management system 122 via mobility coordination module 150.

Enabling FFR for small cell radios that neighbor macro cell radios can be used to provide larger coverage areas for the small cell radio(s) while protecting high mobility UEs associated with (e.g., currently connected and attempting to connect to) the neighboring macro cell radio(s) from interference on the PDSCH that can be caused by the small cell radios. In some embodiments, the architecture of communication system 100 can provide for computing power levels and the fraction of resources for small cell FFR to protect macro UEs. When FFR is not enabled for small cell radios that neighbor macro cell radios, more aggressive transmit power reductions for the small cell radios may be needed to ensure reliable PDSCH links for high mobility UEs associated with the neighboring macro cell radios.

Various parameters can be used to provide for the joint optimization of small cell max transmit power and load balancing of high mobility UEs using the architecture of communication system 100. Parameters '$\Delta^{up}$' and '$\Delta^{dn}$' can represent up and down step sizes, respectively, for adjusting a given handover threshold level. Parameters '$H^{min}$' and '$H^{max}$' can represent minimum and maximum values, respectively, of undesirable handover rates of high mobility UE associated with one or more macro cell radio(s) to one or more small cell radio(s). Parameters '$L^{min}$' and '$L^{max}$', can represent minimum and maximum load level values, respectively, that can be expected for one or more macro cell radio(s). Parameters '$R^{min}$' and '$R^{max}$' can represent acceptable minimum and maximum values, respectively, for RLF failure rates for low mobility UE associated with (e.g., currently connected, previously connected and attempting to connect to) one or more small cell radio(s) due to poor coverage area.

A parameter '$H(m_i, c_j)$' can represent a rate of undesirable handovers between a given macro cell radio $m_i$ to a given small cell radio $c_j$. In accordance with various embodiments, a handover from a given macro cell radio to a given small cell radio is considered undesirable if it is determined that at least one of the following conditions is true: handover of a given UE was successful to a given small cell radio but the handed over UE had one or more short times of stay at the small cell radio before being handed back to a macro-cell; and/or handover for a given UE was triggered to a given small cell radio but failed due to high mobility of the UE. In at least one embodiment, a time of stay can be considered short if it is less than a particular threshold time (e.g., 1 second). In various embodiments, the threshold time can be set based on X2 latency, desired overhead for Radio Resource Control (RRC) signaling, combinations thereof or the like.

In one embodiment, a handover failure rate for a given macro cell can be calculated by computing an average number of undesirable handovers of UE associated with the macro cell to a given small cell over a predetermined horizon of time. In various embodiments, a predetermined horizon of time can range from approximately 15 minutes to approximately one (1) hour.

According to 3GPP TS 36.331, UE can be configured to store and report mobility history information, which can include, at least in part, a history or list of a number of cells to which the UE had previously been connected, the current cell in which the UE was connected and/or a time spent at each cell. The cells can be listed by a cell identifier (e.g., ID) such as, for example, a Cell Global Identifier (CGI) or an E-UTRAN CGI (ECGI). Thus, in at least one embodiment, mobility reporting can be enabled for UE 112a-112c or any other UE described herein. UE can also be configured store and report RLF information, which can include, at least in part, a history or list of radio link failures experienced by the UE, signal strength information (e.g., RSRP, RSRQ) associated with the link failures. Thus, in at least one embodiment, RLF reporting can be enabled for UE 112a-112c or any other UE described herein.

During operation, in various embodiments, time of stay statistics for each of a given UE (e.g., UE 112a-112c) and/or handover failure rate statistics for each of a given macro cell radio (e.g., macro cell radio 116a, 116b) for a deployment can be determined in a centralized manner via central management system 122 using UE mobility reports sent to the centralized management system from each macro cell radio via one or more messages or can be determined in a distributed manner via mobility reports received by each macro cell radio in which embodiment each macro cell radio can send locally calculated undesirable handover rates to the central management system 122 via one or more messages.

In accordance with various embodiments, load for a given macro cell radio $m_i$, which can be represented using a parameter '$L(m_i)$', can be computed based on one or more of: RB utilization at the macro cell radio; bearer rejects and/or disconnects; the number of Guaranteed Bit Rate (GBR) bearers for which delay up to the rate of the GBR bearers is above a predetermined budget; the number of non-GBR bearers for which their served rate is below a predetermined threshold; combinations thereof or the like. A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a UE and one or more nodes of the EPC. At a minimum, a default bearer, as defined in 3GPP standards, is established for each UE 112a-112c upon attachment of each UE 112a-112c to a corresponding cell radio. The default bearer is associated with an IP address for the UE, which can be assigned via DHCP, SLAAC, from a pool of IP addresses, etc., and an IP address for an EPC node. A default bearer is typically used to exchange non-GBR traffic with a given UE.

In some embodiments, one or more dedicated bearers can be established for a given UE for one or more specialized services or applications provided to the UE such as, for example, a Voice over LTE (VoLTE) session, a data session, a Voice over IP (VoIP) session, a video session, a gaming session, combinations thereof or the like. In various embodiments, dedicated bearers can be associated with GBR traffic and/or Quality of Service (QoS) level requirements for such traffic, which can affect priority when scheduling RBs for data packets associated with such bearers. In various embodiments, QoS level requirements can define for a particular bearer or bearer type: a priority; a packet drop structure (e.g., number of packets that can be dropped or re-ordered); timing requirements and/or other similar packet level requirements. In some embodiments, a QoS level requirement and any requirements defined thereby can be associated to a corresponding QoS Class Identifier (QCI). QoS level requirements are not typically provided for default bearers; however, in at least one embodiment, a default bearer can be configured with a minimum rate or threshold at which default bearers are to be served. During operation, in various embodiments, macro loading statistics (e.g., RB utilization, bearer rejects and/or disconnects, GBR/non-GBR statistics, etc.)(e.g., macro cell radios 116a-116b) for a given deployment can be collected in a distributed manner via each macro cell radio and sent to the central management system 122. In one embodiment, each macro cell radio 116a-116b can send loading reports to central management system 122 including loading statistics for each macro cell radio via one or more messages. In various embodiments, each macro cell radio 116a-116b can send loading reports to the central management system 122 on a periodic basis or on an event-based basis (e.g., loading reaches or falls below one or more levels, undesirable handover rates reach or fall below one or more levels, etc.) via one or more messages. In other embodiments, central management system 122 can query each macro cell radio 116a-116b for loading reports.

In accordance with various embodiments, a given UE is assumed to have a radio link failure (RLF) if the following conditions is met: the UE goes into an RRC IDLE mode or sends an RRC re-establishment message to a given small cell radio due to low PDCCH SINR from the small cell radio such that the cause for the re-establishment is a RLF; and the UE is not considered to be a high mobility UE. As an RLF can, in some cases, cause a UE to be handed back over to a neighboring macro cell radio, RLF failure rate statistics can be collected from each of a given small cell radio (e.g., small cell radio 114a, 114b) and each of a given macro cell radio (e.g., macro cell radio 116a-116b) for a deployment. As provided by various embodiments discussed herein, each UE for a given deployment (e.g., UE 112a-112c) can be configured to provide RLF reports to their serving cell radio, as prescribed by 3GPP standards.

In one embodiment, RLF failure rate statistics can be calculated by computing an average number of radio link failures associated with UE handed over to a given small cell radio from a neighboring macro cell radio (e.g., from macro cell radio 116a to small cell radio 114a) over a predetermined horizon of time. In various embodiments, a predetermined horizon of time can range from approximately 15 minutes to approximately one (1) hour.

During operation, in various embodiments, RLF failure rate statistics for UE associated with each of small cell radio 114a, 114b and each macro cell radio 116a, 116b can be calculated over a predetermined horizon of time. Each cell radio can send an RLF failure rate report to central management system 122 including RLF failure rate statistic(s) calculated over the predetermined horizon of time via one or more messages sent to the central management system. In one embodiment, central management system 122, via mobility coordination module, can collect RLF failure rate statistics for a particular small cell radio, as may be reported by either the small cell radio itself, one or more neighboring small cell radio(s) and/or one or more neighboring macro cell radio(s). The collected RLF failure rate statistics can be averaged together to determine an overall RLF failure rate for the particular small cell radio. The RLF failure rate for a given small cell radio $c_i$ can be represented using a parameter '$R(c_i)$'.

In at least one embodiment, assuming each macro cell radio 116a-116b and each small cell radio 114a-114b is capable of distinguishing between high and low mobility UEs, each cell radio can send an RLF failure rate report to the central management system including RLF failure rate statistics per UE classification (e.g., statistics for low mobility UEs and statistics for high mobility UEs) via one or more messages sent to the central management system.

In one embodiment, each cell radio 114a-114b, 116a-116b can include RLF failure rate statistics for one horizon of time or different horizons of time via RLF failure rate reporting. In various embodiments, each cell radio 114a-114b, 116a-116b can send RLF failure rate reports to the central management system 122 on a periodic basis or on an event-based basis. In various embodiments, central management system 122 can query each cell radio 114a-114b, 116a-116b for RLF failure rate reports on a periodic basis or on an event-based basis.

In various embodiments, $H^{min}$ and $H^{max}$, $L^{min}$ and $L^{max}$, and $R^{min}$ and $R^{max}$ can be set by a network operator according to Key Performance Indicators (KPIs) for a deployment, which can vary depending on the deployment characteristics and how the operator wants to trade off performance. For $H^{min}$, generally a higher value means more UEs will be handed off when small cell radio signal strength is stronger than macro cell radio signal strength even if it leads to bad performance for high mobility UEs, which would typically increase overall network capacity while degrading performance of high mobility UEs. In various embodiments, $H^{min}$ and $H^{max}$ can typically be set in a range of approximately 1 to 10 percent (%) of all handovers being undesirable. In various embodiments, $L^{min}$ and $L^{max}$ can typically be set in a range of approximately 80% to 90% of RBs occupied as load indicators, which would allow for some spare capacity at a macro cell radio to handle voice calls. In various embodiments, $R^{min}$ and $R^{max}$ can typically be set in a range of approximately 0.5% to 2.0% as RLFs are bad for user experience and expensive in terms of getting a UE connected again following a RLF. At least one embodiment, $\Delta^{up}$ and $\Delta^{dn}$ can each be set to 1 dB.

During operation, in accordance with various embodiments, joint optimizations of high mobility HO threshold(s) for macro cell radio(s) 116a-116b and transmit power levels of small cell radios 114a-116 of can be performed in order to achieve various goals, which can include, but not be limited to: setting the maximum transmit power for each of a give small cell radio (e.g., each of small cell radio 114a, 114b) such that: 1) a UE associated with a given macro cell can decode transmissions from the macro cell at an SINR above a fixed minimum SINR, which can be represented using a parameter '$\gamma_{min}$', while ensuring that RLF rates for small cell radios, which may be caused due to poor coverage for the small cells, remains below $R^{max}$ when low mobility UEs are handed over from the macro cell radio; and 2) cell splitting gains can be maximized by increasing small cell maximum transmit power when all high mobility UEs associated with the macro cell can decode transmissions from a given macro cell radio at an SINR of greater than a nominal SINR, which can be represented using a parameter '$\gamma_{nom}$'.

During operation, in accordance with at least one embodiment, central management system 122, via mobility coordination module 150, can set the high mobility HO threshold $\Delta_{HIGH}(m_i, c_i)$ between a given macro cell radio a given macro cell radio $m_i$ and a given small cell radio $c_i$ based, at least in part, on feedback information generated by and received from the small cell radio, the macro cell radio and UE associated with the macro cell radio and/or the small cell radio.

In various embodiments, feedback information generated by small cell radios 114a-114b and/or macro cell radios 116a-116b can include, but not be limited to, UE measurement report information (e.g., signal strength information), UE mobility report information (e.g., mobility history for UE served by a cell radio and/or time of stay statistics calculated at each cell radio), RLF failure rate report information, a rate of undesirable handovers of high mobility UE associated with a given macro cell radio(s), loading statistics (e.g., reports) for a given macro cell radio(s), cell radio transmit power (e.g., for macro and/or small cell radios, if not tracked or stored by the central management system) and/or FFR pattern information. In one embodiment, feedback information received from a given macro cell radio can include $\Delta_{HIGH}(m_i, c_i)$ and/or $\Delta_{LOW}(m_i, c_i)$ for each small cell radio $c_i$, neighboring the macro cell radio $m_i$ if such information is not tracked or stored by the central management system.

In at least one embodiment, the high mobility HO threshold $\Delta_{HIGH}(m_i, c_i)$ between a given macro cell radio a given macro cell radio $m_i$ and a given small cell radio $c_i$ can be set by central management system 122 via mobility coordination module 150 using the feedback information according to a set of high mobility HO threshold criteria: $H^{min}$, $H^{max}$, $L^{min}$ and $L^{max}$ for a given macro cell radio which $m_i$, each of which can be configured for the central management system 122 by a network operator, as discussed herein. The high mobility HO threshold criteria can be used to evaluate the rate of undesirable handovers for the macro cell radio $H(m_i, c_i)$ and the loading for the macro cell radio $L(m_i)$ based on various relationships, discussed below.

The high mobility HO threshold criteria can be evaluated according to a number of relationships that seek balance the performance of high mobility UEs associated with the macro cell radio in combination with the loading of the macro cell radio to as follows:

Relationship (1) If $H(m_i, c_i) < H^{min}$, then $\Delta_{HIGH}(m_i, c_i) = \Delta_{HIGH}(m_i, c_i) + \Delta^{up}$, which can result in more high mobility UEs being handed over to the small cell radio $c_i$; or Relationship (2) If $H^{min} \le H(m_i, c_i) < H^{max}$ and $L(m_i) \ge L^{max}$, then $\Delta_{HIGH}(m_i, c_i) = \Delta_{HIGH}(m_i, c_i) + \Delta^{up}$, which can also result in more high mobility UEs being handed over to the small cell radio $c_i$; or Relationship (3) If $H(m_i, c_i) \ge H^{max}$, then $\Delta_{HIGH}(m_i, c_i) = \Delta_{HIGH}(m_i, c_i) - \Delta^{dn}$, which can result in less high mobility UEs being handed over to the small cell radio $c_i$; or Relationship (4) If $H(m_i, c_i) < H^{max}$ and one of: (a) $L(m_i) < L^{min}$ or (b) $L^{min} \le L(m_i) < L^{max}$, then $\Delta_{HIGH}(m_i, c_i) = \Delta_{HIGH}(m_i, c_i) - \Delta^{dn}$, which can also result in less high mobility UEs being handed over to the small cell radio $c_i$.

As discussed herein, the term 'evaluating' and variations thereof can refer to determining whether a certain relationship, which can represent logical comparison(s), binary comparison(s), numerical comparison(s), combinations thereof or the like, is true or false. By evaluating each of Relationships (1-4) during operation, the high mobility HO threshold $\Delta_{HIGH}(m_i, c_i)$ can be set on a periodic or an event-based basis (e.g., undesirable handover rate or load increases beyond a maximum level) to balance the performance of high mobility UEs associated with the macro cell radio (e.g., monitoring undesirable handover rates of high mobility UE) in combination with the loading of the macro cell radio (e.g., to offload high mobility UEs when feasible) such that high mobility UEs remain connected to the macro cell when there is capacity at the macro cell to support the UEs. It should be understood that other relationships and/or criteria could be used to set the high mobility HO threshold for a given macro cell radio.

The maximum transmit power $P(c_i)$ for small cell radio $c_i$ can be set by central management system 122 via mobility coordination module 150 using the feedback information according to a set of small cell transmit power criteria: a minimum SINR $\gamma_{min}$ and a maximum SINR $\gamma_{max}$ expected for UE associated with a given macro cell radio $m_i$ and $R^{max}$ for a given small cell radio $c_i$, each of which can be configuration for the central management system 122 by a network operator, as discussed herein. The small cell transmit power criteria can be used to evaluate the high mobility HO threshold $\Delta_{HIGH}(m_i, c_i)$ set for macro cell radio $m_i$ and the RLF failure rate $R(c_i)$ of the small cell radio based on various relationships, discussed below.

The small cell transmit power criteria can be evaluated according to a number of relationships as follows:

If Relationship [A]: $(\Delta_{HIGH}(m_i, c_i) > -\gamma_{min})$ and Relationship [B]: $R(c_i) < R^{max}$, then [C]: $P(m_i, c_i) = P(m_i, c_i) - (\Delta_{HIGH}(m_i, c_i) + \gamma_{min})$ and [D]: $\Delta_{HIGH}(m_i, c_i) = \gamma_{min}$; otherwise If Relationship [E]: $\Delta_{HIGH}(m_i, c_i) < \gamma_{max}$, then [F]: $P(m_i, c_i) = P(m_i, c_i) + \Delta P$.

A description of various operations and relationships involved in setting the small cell maximum transmit power is now provided. A parameter '$\Delta P$' can represent an up-step for increasing power. In various embodiments, $\Delta P$ can be set in a range from approximately 1 dB to approximately 2 dB. The evaluation of Relationship [A] Is used to check when the high mobility HO threshold $\Delta_{HIGH}(m_i, c_i)$ has been increased beyond a level at which UEs associated with the macro can be expected to attain a minimum SINR of $\gamma_{min}$ and the evaluation of Relationship [B] is used to check whether the RLF failure rate $R(c_i)$ of low mobility UEs handed over to small cell radio $c_i$ is below $R^{max}$. So long as Relationships [A] and [B] are true, then the maximum transmit power constraint $P(m_i, c_i)$ is reduced at [C] and the high mobility handover threshold $\Delta_{HIGH}(m_i, c_i)$ is reset to $\gamma_{min}$ at [D] such that low mobility UEs will remain connected to the small cell radio while limiting interference to high mobility macro UEs at the edge of the coverage area of the small cell radio. Otherwise, if both of the Relationships [A] and [B] are false, a check can be performed using Relationship [E] to determine whether $\Delta_{HIGH}(m_i, c_i)$ has been increased beyond the maximum expected SINR $\gamma_{max}$. If the evaluation at [E] is determined to be true, then the maximum transmit power constraint $P(m_i, c_i)$ is increased at [F].

In essence, if [E] is true, then this can mean that macro UEs at the edge of the coverage area of the small cell radio can still attain a good SINR, that the number of high mobility UEs potentially handed over to the small cell radio will remain low and that more low mobility UEs that can potentially be handed over to the small cell radio can be increased with an increase in small cell maximum transmit power. As noted herein, one goal in setting the maximum downlink transmit power for each small cell radio can include setting the maximum transmit power such that: 1) a UE associated with a given macro cell can decode transmissions from the macro cell at an SINR above a fixed minimum SINR $\gamma_{min}$, while ensuring that RLF rates for small cell radios remain below the maximum RLF failure rate $R^{max}$. Thus, setting the maximum downlink transmit power for the small cell radios can be used to limit interference towards UEs associated with a neighboring macro cell radio while maintaining RLF failure rates for UEs associated with the small cell radios below $R^{max}$.

As noted above, $P(c_i)$ can be set equal to '$\min_{m \in M(c_i)} P(m_i, c_i)$' using on the power constraints $P(m_i, c_i)$ for set of macro cell radios $M(c_i)$ neighboring small cell radio $c_i$. In one embodiment, for example if FFR is enabled for small cell radios 114a-114b and if the pattern is available to a neighboring macro cell radio 116a, 116b, then $\gamma_{min}$ can be set to −3 dB; otherwise, if FFR is not enabled for the small cell radios or if the FFR pattern is not available to a neighboring macro cell radio, the $\gamma_{min}$ can be set to 0 dB. In one embodiment, for example if FFR is enabled for small cell radios 114a-114b and if the pattern is available to a neighboring macro cell radio 116a, 116b, then $\gamma_{max}$ can be set in a range of approximately 3 dB to approximately 5 dB; otherwise, if FFR is not enabled for the small cell radios or if the FFR pattern is not available to a neighboring macro cell radio, the $\gamma_{max}$ can be set to −1 dB. In at least one embodiment, a cell splitting gain for communication system 100 can be maximized by increasing small cell power when all high mobility UEs can decode transmissions from an associated macro cell radio at an SINR of greater than a $\Delta_{nom}$ of 0 dB.

The joint optimization of the maximum transmit power for each small cell radio 114a-114b and the high mobility HO threshold(s) for each macro cell radio 116a-116b can be performed when either the high mobility HO threshold(s) or the maximum transmit power for each small cell radio is set to a new level. In some embodiments, the high mobility HO threshold $\Delta_{HIGH}(m_i, c_i)$ between a given macro cell radio $m_i$ and a given small cell radio $c_i$, can be set to a new level as a result of a transmit power update for the small cell radio. In particular, the high mobility HO threshold $\Delta_{HIGH}(m_i, c_i)$ should be set to a new level if a current threshold level is within the range of 0 to 3 dB to trigger handover.

For example, if the maximum transmit power for a given small cell radio (e.g., small cell radio 114a) is reduced by 2 dB and if the high mobility HO threshold for a neighboring macro cell radio (e.g., macro cell radio 116b) is such that handover occurs only if the small cell RSRP is 3 dB stronger than the macro cell RSRP, then the high mobility HO threshold for the macro cell radio can be reduced in a proportionate amount from 3 dB to 1 dB. There is typically no need for a macro cell radio to serve UEs at −3 dB. Since high mobility UEs may not see high interference from a neighboring small cell serving macro UEs up to −1 dB can be sufficient. Maximum transmit power updates for a small cell radio can be calculated as $\Delta = \Delta + \Delta P$.

For FFR optimizations at each small cell radio 114a-114b, small cell PDSCH EPRE on low power RBs can be set to an average PDSCH EPRE across the low power RBs minus 6 dB, in accordance with one embodiment. This will ensure +3 dB PDSCH SINR on high mobility UEs attached to a macro cell radios 116a-116b when small cell transmit power is increased. For high power RBs, the PDSCH EPRE across the high power RBs can be set to an EPRE that would be obtained if the maximum small cell transmit power was equally divided across all RBs in the frequency domain available for scheduling for each based on system bandwidth.

In one embodiment, the number of RBs for which their PDSCH EPRE is lowered (e.g., number of low power RBs) at a given small cell radio to mitigate interference to high mobility UEs can be varied based on the load imposed on a given macro cell radio by high mobility UEs associated with the macro. For example, in one embodiment, an outer loop algorithm based on reported throughput rates for high mobility UE associated with a macro cell radio can be used to adjust the number of RBs with low EPRE such that the number of RBs can be increased if the throughput rate for high mobility UEs, which can be represented using a parameter '$T_{high\_mobilityUEs}$' is less than a minimum throughput rate, which can be represented using a parameter '$T_{min}$', otherwise the number of RBs can be decreased. In one embodiment, the throughput rate of high mobility UEs associated with a macro can be calculated as an average throughput rate for across all high mobility UEs associated with the macro for a predetermined horizon of time.

In one embodiment, an outer loop algorithm to adjust the number of RBs can be summarized as follows: if $T_{high\_mobilityUEs} < T_{min}$, then the number of RBs with low EPRE+=$\Delta^{up}$, otherwise if $T_{high\_mobilityUEs} > T_{min} + \Delta T_{hysterisis}$, then the number of RBs with low EPRE-=$\Delta^{dn}$, where parameters $\Delta^{up}$ and $\Delta^{dn}$ are step sizes for adjusting the number of RBs and $\Delta T_{hysterisis}$ is an offset configured by a network operator to allow for hysteresis (e.g., to prevent frequent up/down changes in the number of RBs with low EPRE).

Accordingly, the architecture of communication system 100 can provide a system and method to jointly optimize the high mobility UE HO threshold(s) between each small cell radio 114a-114b and each macro cell radio 116a-116b as well as the maximum transmit power of each small cell radio 114a-114b in accordance with various embodiments.

It should be noted that any UE signal strength information can be used among various embodiments described within the scope of the present disclosure for setting the maximum transmit power for small cell radios 114a-114b. In at least one embodiment, for example, for a 3G deployment, signal strength information can include Common Pilot Channel (CPICH) energy per chip to total PSD at the UE antenna (Ec/Io) and/or CPICH Received Signal Code Power (RSCP) as defined in 3GPP standards. In another embodiment, for example, for a WiFi deployment, signal strength information can include Received Signal Strength Indicator (RSSI), Received Channel Power Indicator (RCPI), combinations thereof, or other similar signal strength information. Accordingly, although many of the example embodiments discussed herein are described with reference to RSRP and/or RSRQ signal strength information, it should be understood that signal strength information as discussed for the various embodiments described herein can cover a multitude of access network types including both 3GPP and non-3GPP access networks.

In certain embodiments, a downlink CQI reported by a given UE can be used to determine downlink SINR for the UE by using the CQI reported for a given UE as a proxy for determining downlink SINR. Generally, the CQI reported by a UE may be used to determine the Modulation and Coding Scheme (MCS) at which the cell radio to which the UE is connected needs to transmit packets to the UE such that the UE will receive packets at a 10% Block Error Ratio (BLER). If an Average White Gaussian Noise (AWGN) channel is assumed for the UE, an SINR can be determined that will lead to a 10% BLER based on the MCS chosen by the cell radio for downlink transmissions to the UE.

Generally, each MCS from which the cell radio can choose for downlink transmissions can be mapped to one or more SINR values or a range of SINR values, thereby enabling SINR determinations using the MCS chosen for downlink transmissions. Although UE manufacturers often implement different receivers, etc. for their equipment, which can lead to non-one-to-one MCS to SINR mappings, CQI can be used to determine an approximate SINR for a given UE based on the assumption that, as SINR increases for a UE, CQI can also increase because the UE can decode higher order modulation schemes while staying within the 10% BLER threshold.

Under an assumption of approximate uplink and downlink symmetry for a given UE, uplink or downlink SINR can be used for various embodiments described herein. MCS can also be selected for UE for uplink transmissions. As provided by 3GPP standards (e.g., TS 36.211), MCS for uplink UE transmissions can include Quadrature Phase Shift Keying (QPSK) and Quadrature Amplitude Modulation (QAM) including 16QAM, 64QAM and 256QAM with modulation order increasing from QPSK to 256QAM.

In various embodiments, each macro cell radio 116a-116b can be deployed as an evolved Node B (eNodeB or eNB), which can provide cellular/mobile coverage for a 4G/LTE macro cell network, and/or a Node B (NodeB), which can provide cellular/mobile coverage for a 2G/3G macro cell network. In general a NodeB is deployed in combination with a Radio Network Controller (RNC), which may provide radio control for the NodeB. In various embodiments, macro cell radio 116 can be responsible for selecting a Mobility Management Entity (MME) or a serving General Packet Radio Service (GPRS) support node (SGSN) within service provider network 130 for session establishment for each UE served by each macro cell radio 116a-116b and for managing radio resources for such UE. In various embodiments, each macro cell radio 116a-116b can include one or transmitters and/or receivers (e.g., transceivers) and one or more antenna(s) to facilitate over the air communications with one or more UE served thereby.

In various embodiments, each small cell radio 114a-114b can be deployed as home evolved NodeBs (HeNBs), which can provide cellular/mobile coverage for a 4G/LTE small cell network, and/or can be deployed has Home Node Bs (HNBs), which can provide cellular/mobile coverage for a 2G/3G small cell network. In some embodiments, each small cell radio 114a-114b can be deployed as a 'single-stack' device offering 4G/LTE or 2G/3G connectivity, a 'dual-stack' device offering 4G/LTE or 2G/3G connectivity in combination with wireless (e.g., WiFi) connectivity, or a 'triple-stack' device offering 4G/LTE connectivity, 2G/3G connectivity and wireless connectivity.

Typically, small cell radios operate at lower power levels as compared to macro cell radios to provide services to proximate users, for example, within in a business or residential environment (e.g., within a building, home, etc.). In some embodiments, small cell radios (e.g., 114a-114b) can be deployed in business (e.g., enterprise) environments within predefined clusters, grids or groups that can be optimized to provide contiguous or overlapping cellular/mobile coverage for enterprise users (e.g., employees, visitors, etc.) when such users are located within a coverage area of small cell radios deployed in such a cluster/grid. In some embodiments, small cell radios can be deployed in residential or densely populate environments to provide cellular/wireless connectivity in areas where macro cell radio coverage area(s) may be limited and/or overloaded.

In some embodiments, small cell radios 114a-114b can interface with service provider network 130 via one or more small cell gateways (not shown), which can be used to aggregate and/or manage sessions for UE connected to the small cell network. Small cell radios can be connected using a standard broadband digital subscriber line (DSL), internet or cable service into service provider network 130 via the one or more small cell gateways. Calls can be made and received, where the signals are sent (potentially encrypted) from a given small cell radio via a broadband IP network (e.g., the Internet) to one of the service provider's main switching centers. In some embodiments, small cell radios 114a-114b can also interface with a small cell management system, which can be used to manage configurations (e.g., communication protocols, data models, etc.) for small cell radios 114a-114b. In some embodiments, the small cell management system can be included within central management system 122 or can be provided separate from the central management system. In various embodiments, each small cell radio 114a-114b can include one or transmitters and/or receivers (e.g., transceivers) and one or more antenna(s) to facilitate over the air communications with one or more UE served thereby.

In various embodiments, UE 112a-112c can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an Internet protocol (IP) phone, or any other device, component, element, or object capable of initiating voice, audio, video, media, or data exchanges within communication system 100. UE 112a-112c may also be inclusive of a suitable interface to a human user such as a microphone, a display, a keyboard, or other terminal equipment.

UE 112a-112c may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In some embodiments, UE 112a-112c may have a bundled subscription for network access and application services (e.g., voice), etc. Once the access session is established, the user can register for application services as well, without additional authentication requirements. IP addresses can be assigned within communication system 100 using dynamic host configuration protocol (DHCP), Stateless Address Auto-configuration (SLAAC), during bearer and/or session activation procedures, etc., or any suitable variation thereof. In various embodiments IP address can be configured as IP version 4 (IPv4) or IP version 6 (IPv6). In various embodiments, each UE 112a-112c can include one or more transmitters and/or receivers (e.g., transceivers) and one or more antenna(s) to facilitate over the air communications with one or more small cell radios 114a-114b and/or macro cell radios 116a-116b.

In various embodiments, interfaces and/or a series of interfaces can be provided in communication system 100 (e.g., for elements of communication system 100), which can offer interoperation for mobility, policy control, power control, load balancing, interference coordination or other operations between various elements of communication system 100. For example, interfaces can be used to exchange point of attachment, location, and/or access data for one or more end users, for example, users operating UE 112a-112c or any other UE. In various embodiments, resource information, accounting information, location information, access network information, network address translation (NAT) control, etc. can be exchanged using a remote authentication dial in user service (RADIUS) protocol or any other suitable protocol where appropriate. Other communication protocols that can be used in communication system 100 can include DIAMETER protocol, service gateway interface (SGi), terminal access controller access-control system (TACACS), TACACS+, etc. to facilitate communications. In various embodiments, small cell radios 114a-114b may logically be connected to each other and/or to macro cell radio 116a-116b via an X2 interface (not shown in FIG. 1A), as defined in 3GPP standards.

RAN 120 is a communications interface between UE (e.g., 112a-112c), central management system 122 and service provider network 130 via small cell radios 114a-114b and/or macro cell radios 116a-116b. Via small cell radios 114a-114b and/or macro cell radios 116a-116b, RAN 120 may provide one or more coverage areas for servicing multiple end users and for managing their associated connectivity. The communications interface provided by RAN 120 may allow data to be exchanged between an end user and any number of selected elements within communication system 100. For example, RAN 120 may facilitate the delivery of a request packet (e.g., request for service(s)) generated by a given UE (e.g., UE 112a) and the reception of information sought by an end user associated with the UE.

In various embodiments, RAN 120 may include 3GPP access networks such as, for example, Global System for Mobile Communications (GSM) Enhanced Data Rates for GSM Evolution (EDGE) Radio Access Network (GERAN), generally referred to as 2G; Universal Mobile Telecommunications System (UMTS) Terrestrial Radio Access Network (UTRAN), generally referred to as 3G; and/or evolved UTRAN (E-UTRAN), generally referred to as 4G, Long Term Evolution (LTE) and/or LTE-Advanced (LTE-A). In various embodiments, RAN 120 may include non-3GPP IP access networks such as digital subscriber line (DSL), Cable, wireless local area network (WLAN) (e.g., Wireless Fidelity (WiFi), Worldwide Interoperability for Microwave Access (WIMAX)) and/or the Internet. RAN 120 is only one example of a communications interface between an end user, central management system 122 and service provider network 130. Other suitable types of communications interfaces may be used for any appropriate network design and, further, be based on specific communications architectures in accordance with particular needs.

In general, service provider network 130 represents a series of points or nodes of interconnected communication paths for receiving and transmitting packets of information that may propagate through communication system 100. In various embodiments, service provider network 130 can be configured according to 3GPP standards to include one or more elements of an Evolved Packet Core (EPC), a packet-switched (PS) architecture and/or a circuit-switched (CS) architecture as prescribed by 3GPP standards in order to provide services (e.g., voice, data, multimedia, etc.) and Interconnectivity to UE 112a-112c to one or more packet data networks (PDNs) (e.g., the Internet).

In various embodiments, service provider network 130 may offer communicative interfaces between UE 112a-112c and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. In some embodiments, communications in a network environment can be facilitated through the exchange of packets. A packet is a formatted unit of data and can contain both control information (e.g., source and destination address, etc.) and data, which is also known as payload. Network traffic can be sent and received according to any suitable communication messaging protocols. Suitable communication messaging protocols can include a multi-layered scheme such as the Open Systems Interconnection (OSI) Model, or any derivations or variants thereof. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs. However, any other suitable communication protocol for transmitting and receiving data packets within communication system 100 may be alternatively implemented.

Figure 2A:
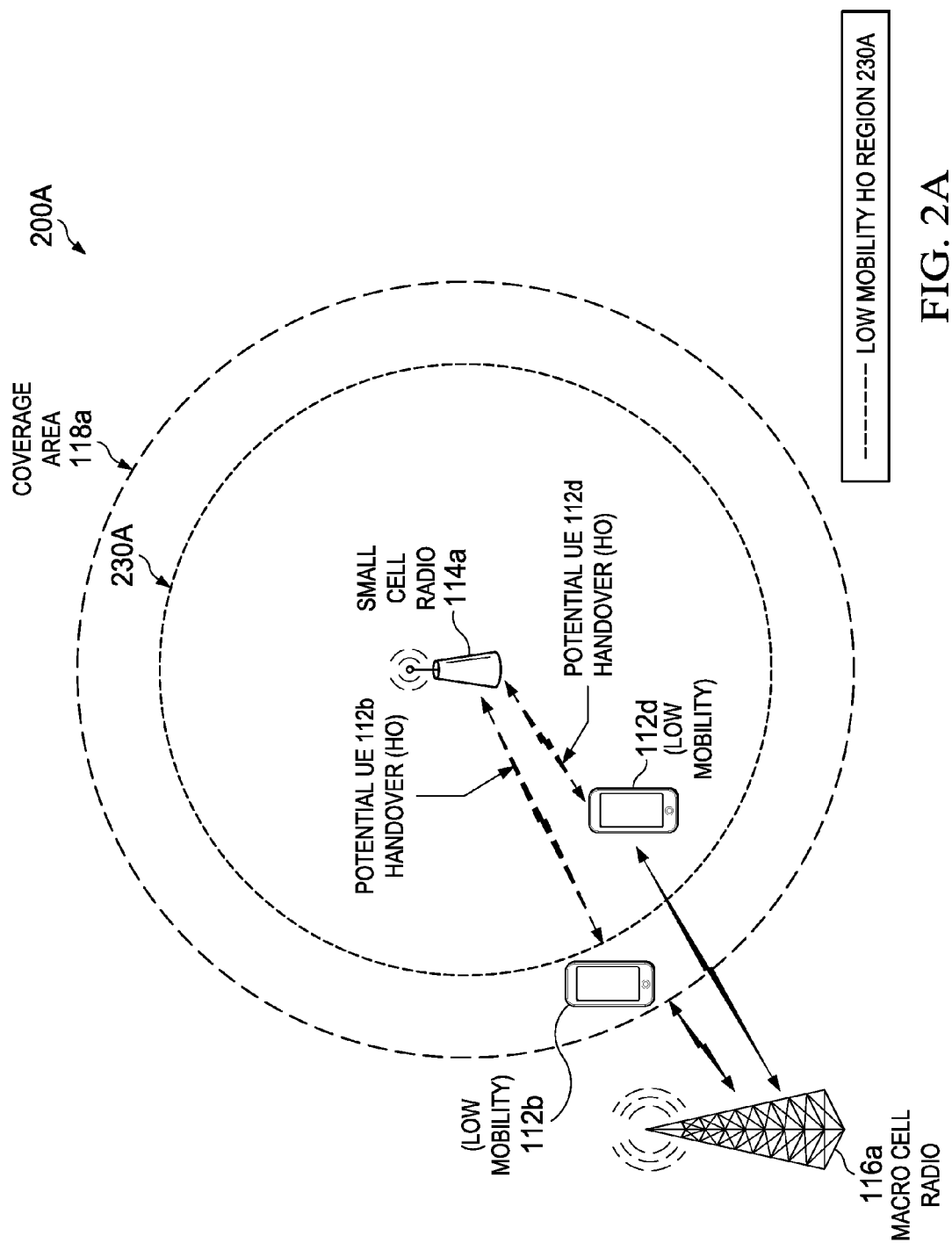
FIGS. 2A-2B are simplified schematic diagrams illustrating example features associated with optimizing a low mobility UE handover threshold for a particular macro cell radio in relation to a particular small cell radio in accordance with one potential embodiment of the communication system.
Figure 2B:
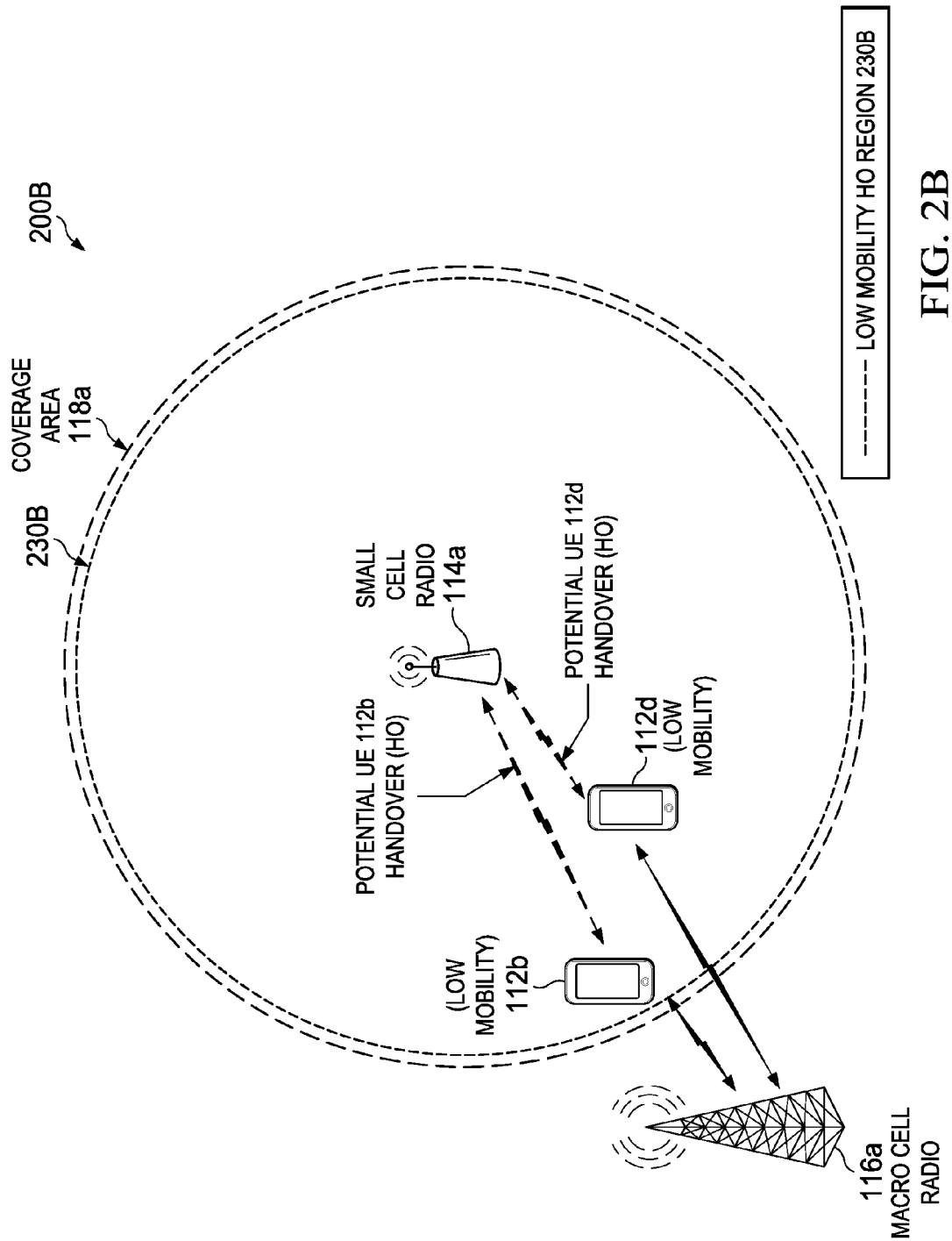

Turning to FIGS. 2A-2B, FIGS. 2A-2B are simplified block diagrams 200A-200B illustrating example features associated with optimizing a low mobility UE HO threshold for a particular macro cell radio (e.g., macro cell radio 116a) in relation to a particular small cell radio (e.g., small cell radio 114a) in accordance with various potential embodiments of communication system 100. Also shown in FIGS. 2A-2B are UE 112b and another UE 112d both of which may be considered to be low mobility UEs associated with macro cell radio 116a. For purposes of the embodiment shown in FIGS. 2A-2B, the low mobility HO threshold can be represented as $\Delta_{LOW}(m_{116a}, c_{114a})$. For the embodiments shown in FIGS. 2A-2B small cell radio 114a is assumed to have a same transmit power in each of FIGS. 2A and 2B such that a coverage area 118a is approximately the same for each FIGURE.

Referring to FIG. 2A, FIG. 2A illustrates an example use case in which FFR is not implemented at macro cell radio 116a or small cell radio 114a is not made aware of the FFR pattern implemented at macro cell radio 116a. Referring to FIG. 2B, FIG. 2B illustrates an example use case in which FFR is implemented at macro cell radio 116a and small cell radio 114a is made aware of the FFR pattern used by macro cell radio 116a. In one embodiment, macro cell radio 116a can provide the FFR pattern to central management system 122, which can provide the FFR pattern to small cell radio 114a. In another embodiment, macro cell radio 116a can send its FFR pattern to small cell radio 114a via X2 interface signaling.

In accordance with one embodiment, optimizations the low mobility HO threshold can be performed in order to provide handover of low mobility UEs from a macro cell radio to a small cell radio as long as interference toward the macro cell radio can be mitigated and capacity for a deployment can be increased.

For the embodiment shown in 2A in which no FFR is assumed to be implemented at macro cell radio 116a or small cell radio 114a not made aware of the FFR pattern, the low mobility HO threshold $\Delta_{LOW}(m_{116a}, c_{114a})$ can be set to a level such that a low mobility HO region 230A is reduced relative to the coverage area 118a. By setting the low mobility HO threshold to a level resulting in a smaller low mobility HO region 230A, as shown in the embodiment of FIG. 2A, handover of low mobility UE 112d would be triggered towards small cell radio 114a while handover of low mobility UE 112b would not be triggered.

Although reduction of the low mobility HO region can result in less low mobility UEs being handed over to the small cell radio 114a, interference towards macro cell radio 116a can be mitigated. If the range of the range of the low mobility HO threshold were larger, then interference to a neighboring macro cell due downlink transmissions to low mobility UE handed over to a small cell radio would not be mitigated even if one cell is much more lightly loaded. By not triggering handover of UE 112b to the small cell radio, interference that could potentially be caused toward other UE served by the macro cell radio through the small cell radio 114a attempting to serve UE 112b can be mitigated toward the macro cell radio 116a.

For embodiments in which no FFR is implemented at a neighboring macro cell or in which a neighboring small cell radio is not made aware of the macro FFR pattern, the low mobility HO threshold can be set within a range of approximately −2 dB to approximately 1 dB [−2 1] (e.g., the small cell RSRP is just weaker than the macro RSRP by 2 dB or the small cell RSRP is stronger than the macro cell RSRP by one (1) dB); thus, a PDSCH SINR>0 dB for UEs associated with neighboring macro cell radio 116a not handed over to small cell radio 114a can be assured.

For the embodiment shown in FIG. 2B in which FFR is assumed to be implemented at macro cell radio 116a and small cell radio 114a is assumed to be made aware of the FFR pattern, the low mobility HO threshold $\Delta_{LOW}(m_{116a}, c_{114a})$ can be set to a level such that a low mobility HO region 230B can cover a larger region of coverage area 118a than when no FFR is implemented at the macro cell radio or the small cell radio is not made aware of the macro FFR pattern as shown for the embodiment of FIG. 2A.

By setting the low mobility HO threshold to a level resulting in a larger low mobility HO region 230B, handover of both low mobility UE 112b and UE 112d would be triggered towards small cell radio 114a. Because FFR is enabled at the macro cell radio 116a and small cell radio 114a is aware of the FFR pattern of the macro cell radio, small cell radio 114a can serve UE 112b via high power downlink RBs during periods where macro cell radio 116a is not attempting to serve UE at corresponding frequencies or times. Thus, more low mobility UEs could be handed over to small cell radio 114a while interference toward UE served by the macro cell radio can be mitigated.

For embodiments in which FFR is implemented at a neighboring macro cell and in which a neighboring small cell radio is made aware of the macro FFR pattern, the low mobility HO threshold can be set within a range of approximately −5 dB to approximately 1 dB [−5 1] (e.g., the small cell RSRP is just weaker than the macro RSRP by 5 dB or the small cell RSRP is stronger than the macro cell RSRP by one (1) dB); thus, a PDSCH SINR>0 dB and a PDCCH SINR>−5 dB for UEs associated with neighboring macro cell radio 116a not handed over to small cell radio 114a can be assured.

In accordance with various embodiments, setting the low mobility HO threshold for a given macro cell radio (e.g., macro cell radio 116a, 116b) can involve optimizing the threshold to optimize capacity for a given deployment. In at least one embodiment, the optimizations can be based on an evaluation of capacity relationships for a deployment assuming $\Delta_{LOW}(m_i, c_i)$ is set to a current level and assuming resources (e.g., both high and low SINR, if FFR is enabled) are equally distributed among all UEs attached to a macro cell as follows: Relationship (i): consider all low mobility UEs currently associated with macro cell radio $m_i$ for which, if reducing the current level of the threshold by 1 dB, these UEs would be handed over to small cell radio $c_i$; compute current capacity at the macro cell radio when these UEs are associated with the macro and compute an estimated capacity at the macro if these UEs were handed over to the small cell; if the latter estimated capacity is higher than the current capacity, then reduce the current level for $\Delta_{LOW}(m_i, c_i)$ by 1 dB; or Relationship (ii): consider all low mobility UEs currently associated with small cell radio $c_i$ for which, if increasing the current level of the threshold by 1 dB, these UEs would be handed over to macro cell radio $m_i$; compute the current capacity at the small cell radio when all these UEs are associated with the small cell and compute an estimated capacity at the small cell if these UEs were handed over to the macro; if the latter estimated capacity is higher, then increase the current level for $\Delta_{LOW}(m_i, c_i)$ by 1 dB. For Relationship (i), a positive evaluation (e.g., increased capacity) means that one or more neighboring small cells are lightly loaded and/or there are many small cells under the coverage area of a given macro cell radio. For Relationship (ii) a positive evaluation means that the macro cell is lightly loaded.

Figure 3A:
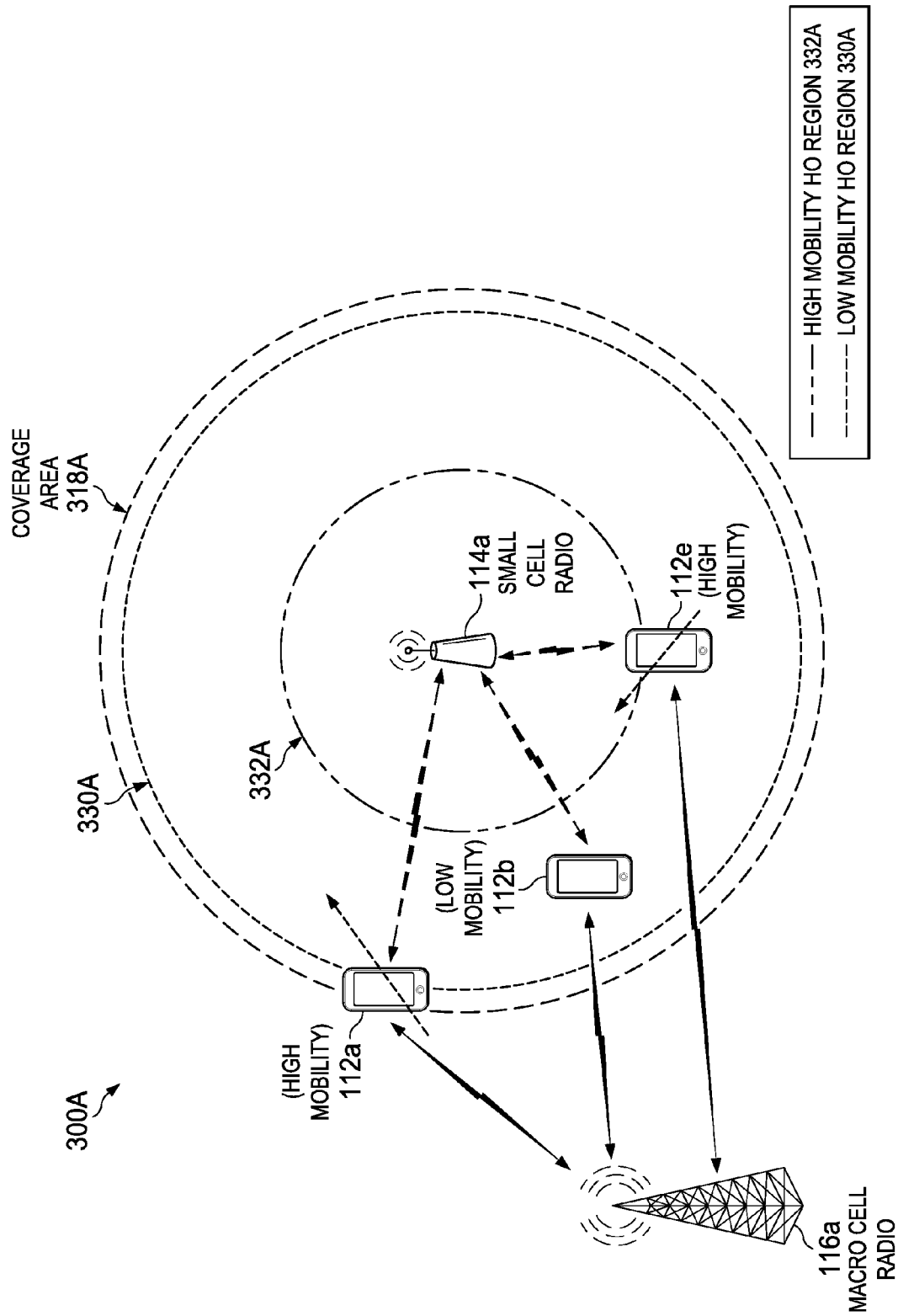
FIGS. 3A-3B are simplified schematic diagrams illustrating example features associated with optimizing UE handover thresholds for a particular macro cell radio in relation to a particular small cell radio in accordance with one potential embodiment of the communication system.
Figure 3B:
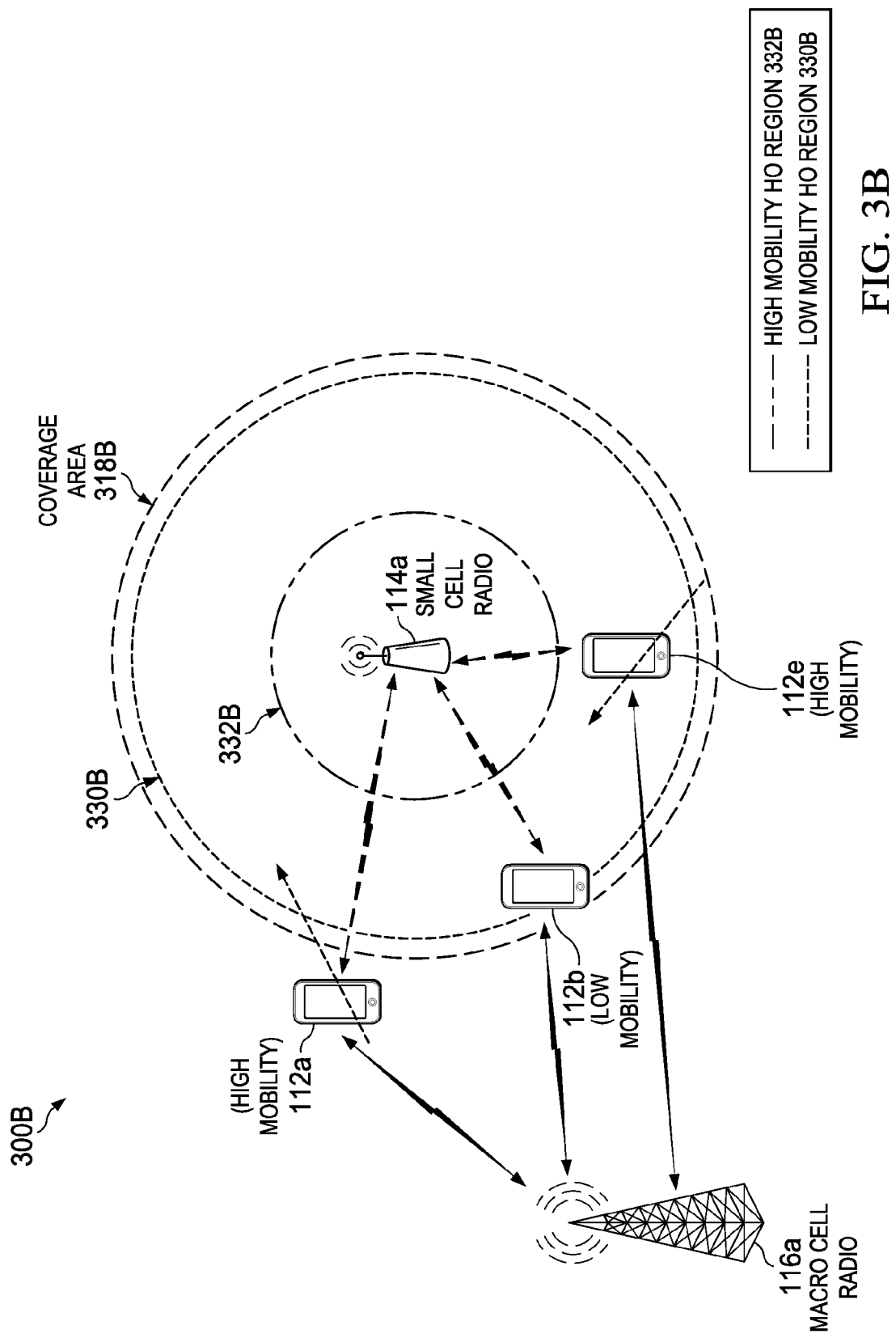

Turning to FIGS. 3A-3B, FIGS. 3A-3B are simplified schematic diagrams 300A-300B illustrating example features associated with optimizing UE handover thresholds for a particular macro cell radio (e.g., macro cell radio 116a) In relation to a particular small cell radio (e.g., small cell radio 114a) In accordance with one potential embodiment of communication system 100. Also shown in FIGS. 3A-3B are UE 112a and another UE 112e both of which may be considered to be high mobility UEs associated with macro cell radio 116a and UE 112b which may be considered to be a low mobility UE associated with macro cell radio 116b.

For the embodiments shown in FIGS. 3A-3B small cell radio 114a is assumed to have a higher transmit power in FIG. 3A than in FIG. 3B such that a first coverage area 318A is shown in FIG. 3A and a second coverage area 318B is shown in FIG. 3B.

Referring to FIG. 3A, FIG. 3A illustrates an example use case in which FFR is implemented at macro cell radio 116a and small cell radio 114a is made aware of the FFR pattern used by macro cell radio 116a. The embodiment shown in FIG. 3A illustrates that a high mobility UE HO threshold can be set, which can result in a high mobility HO region 332A in which HO can be triggered for high mobility UE 112e to small cell radio 114a while HO would not be triggered for high mobility UE 112a. By evaluating high mobility HO criteria, as discussed for various embodiments described herein, the high mobility HO threshold for macro cell radio 116a with respect to small cell radio 114a can be optimized to balance the performance of high mobility UEs 112a and 112e in combination with the loading of macro cell radio 116a. In various embodiments, the high mobility HO threshold for a given macro cell radio can be set within a range of approximately −3 dB to approximately 5 dB [−3 5].

Further, due to FFR being enabled at the macro cell radio 116a and small cell radio 114a being made aware of the FFR pattern, a low mobility HO threshold can be set for macro cell radio 116a, which can result in a low mobility HO region 330A in which HO can be triggered for low mobility UE 112b. For the embodiment shown in FIG. 3A, power levels of the small cell radio 114a can be set such that most low mobility UEs are handed off from macro cell radio 116a with a low mobility HO threshold set to −5 dB; thus, a PDSCH SINR>0 dB and a PDCCH SINR>−5 dB for UEs associated with neighboring macro cell radio 116a not handed over to small cell radio 114a can be assured. In some embodiments, the PDCCH can be reliable up to −7 dB by choosing an appropriate aggregation level (e.g., number and allocation of FFR frequency regions) for the FFR pattern implemented at a macro cell radio.

As discussed for various embodiments provided herein, maximum transmit power for a small cell radio (e.g., small cell radio 114a) can also be optimized in combination with setting the high mobility HO threshold for a macro cell radio (e.g., macro cell radio 116a). Referring to FIG. 3B, FIG. 3B illustrates an example use case in which FFR is implemented at macro cell radio 116a and small cell radio 114a is made aware of the FFR pattern used by macro cell radio 116a. The embodiment shown in FIG. 3B illustrates that that the maximum transmit power for small cell radio 114a can be reduced such that the small cell radio 114a now has a coverage area 318B, which is assumed to be smaller than coverage area 318A of the embodiment shown in FIG. 3A. In addition, a high mobility UE HO threshold can be set for macro cell radio 116a, which can result in a high mobility HO region 332B in which HO would not be triggered for high mobility UE 112a or for high mobility UE 112e.

Due to FFR being enabled at the macro cell radio 116a and small cell radio 114a being made aware of the FFR pattern, a low mobility HO threshold can be set for macro cell radio 116a, which can result in a low mobility HO region 330B in which HO can be triggered for low mobility UE 112b. Thus, for the embodiment shown in FIG. 3B, more high mobility UEs could stay connected to the macro cell radio 116a, assuming loading of the macro cell radio permits, by decreasing the maximum transmit power for small cell radio 114a and setting the high mobility HO threshold of macro cell radio 116a in combination with decreasing the maximum transmit power of small cell radio 114a.

In some embodiments, for example if a macro cell radio is unable to classify UE served thereby as high mobility or low mobility, then the same HO threshold can be set for all UEs associated with the macro cell radio. In some embodiments, if there are more high mobility UEs associated with a neighboring macro cell radio, then the small cell coverage area can be reduced such that more UEs remain associated with a neighboring macro cell radio.

Figure 4:
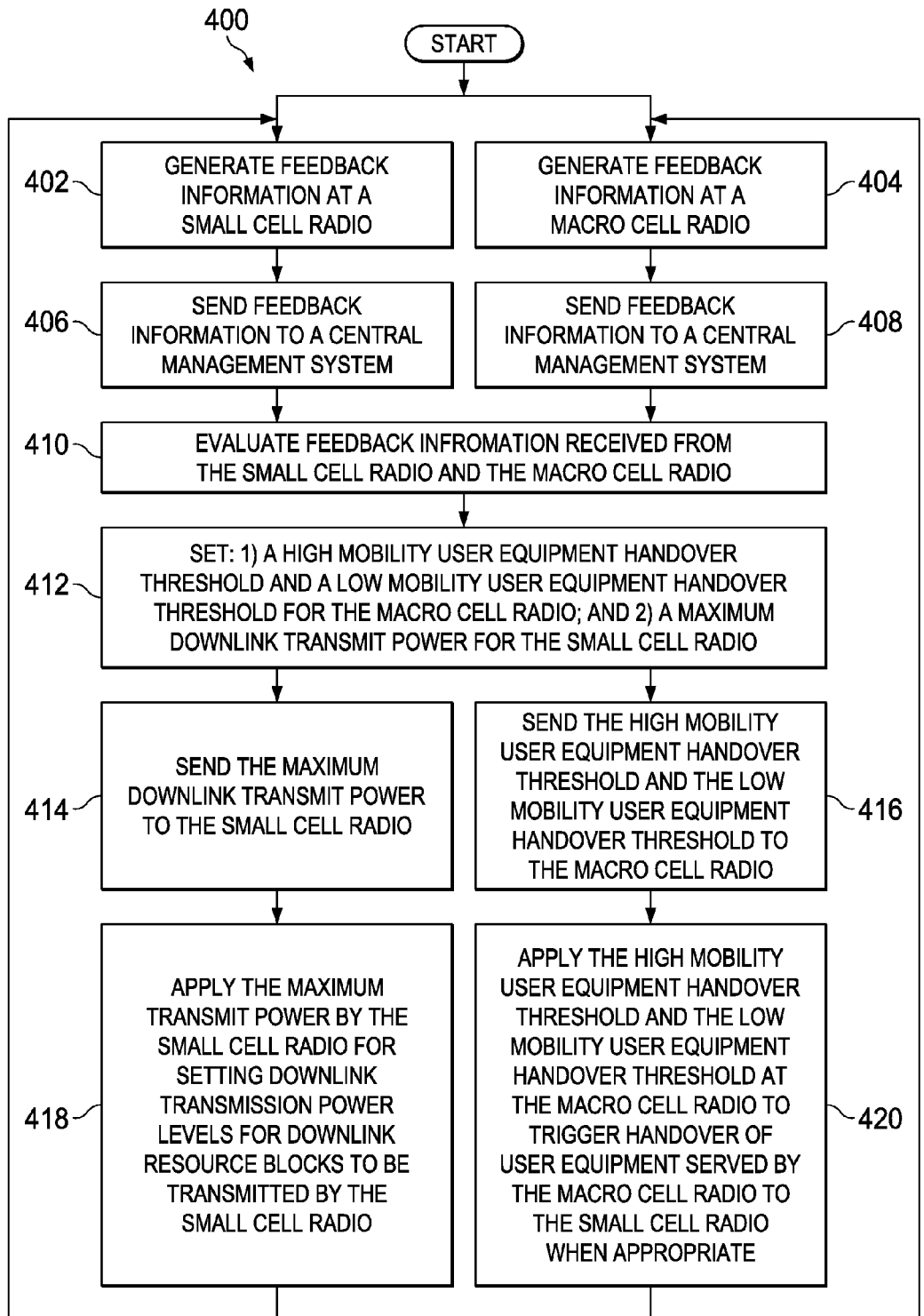
FIG. 4 is a simplified flow diagram illustrating example operations that can be associated with providing small cell maximum transmit power control and load balancing for high mobility UE in a network environment in accordance with one potential embodiment of the communication system.

Referring to FIG. 4, FIG. 4 is a simplified flow diagram illustrating example operations 400 that can be associated with providing small cell maximum transmit power control and load balancing for high mobility UE in a network environment in accordance with one potential embodiment of communication system 100. Operations 400 are described with reference to small cell radio 114a, macro cell radio 116a and central management system 122; however, it should be understood that certain operations described for the embodiment shown in FIG. 4, when appropriate, can be performed equally by and/or for small cell radio 114b or any other small cell radio that may be present in a particular deployment and/or by and/or for macro cell radio 116b or any other macro cell radio that may be present in a particular deployment.

Operations can begin at 402 and 404. At 402, a small cell radio (e.g., small cell radio 114a) can generate feedback information to send to central management system 122 including mobility coordination module 150. At 404, a macro cell radio (e.g., macro cell radio 116a) can generate feedback information to send to central management system 122 including mobility coordination module 150. In various embodiments, feedback information generated by small cell radio 114a and/or macro cell radio 116a can include, but not be limited to, UE measurement report information (e.g., signal strength information), UE mobility report information (e.g., mobility history for UE served by a cell radio and/or time of stay statistics calculated at each cell radio), RLF failure rate report information, a rate of undesirable handovers of high mobility UE associated with macro cell radio 116a, loading statistics (e.g., reports) for a given macro cell radio(s), cell radio transmit power (e.g., for macro cell radio 116a and/or small cell radio 114a, if not tracked or stored by the central management system) and/or FFR pattern information.

At 406, small cell radio 114a can send feedback information generated at the small cell radio to central management system 122 via one or more messages. At 408, macro cell radio 116a can send feedback information generated at the macro cell radio to central management system 122 via one or more messages. It should be noted that the operations performed at 402, 406 and 404, 408 can be performed at a same or different times through a periodic basis, an event-based basis, and/or as queried by central management system 122 through a periodic and/or an event-based basis as configured by a network operator for communication system 100. In at least one embodiment, the feedback information generated at the small cell radio 114a and at the macro cell radio 116b can be generated for a predetermined horizon of time.

At 410, central management system 122 via mobility coordination module 150 can evaluate the feedback information received from the small cell radio 114a and the macro cell radio 116b using various relationships and criteria as discussed for various embodiments provided herein. In various embodiments, Relationships (1)-(4) can be evaluated using high mobility handover (HO) threshold criteria, as discussed herein, to set the high mobility UE HO threshold for the macro cell radio 116a; Relationships [A], [B] and

[E] can be evaluated using small cell transmit power criteria, as discussed herein, to set the maximum downlink transmit power for the small cell radio 114a; and Relationships (i) or (ii), as discussed herein to set the low mobility UE HO threshold for macro cell radio 116a.

At 412, central management system 122 via mobility coordination module sets: 1) a high mobility UE HO threshold and a low mobility UE HO threshold for the macro cell radio 116a; and 2) a maximum downlink transmit power for the small cell radio 114a based on the evaluations performed at 410. At 414, the central management system 122 sends the maximum downlink transmit power to the small cell radio 114a via one or more messages. At 418, the small cell radio 114a applies the maximum transmit power for setting downlink transmission power levels for resource blocks to be transmitted by the small cell radio to one or more UE served by the small cell radio. In at least one embodiment for FFR optimizations performed at small cell radio 114a, small cell radio 114a can set the PDSCH EPRE on low power RBs to an average PDSCH EPRE across low power RBs served by the small cell radio minus 6 dB. For high power RBs, small cell radio 114a can set the PDSCH EPRE across the high power RBs to an EPRE that would be obtained if the maximum small cell radio transmit power is equally divided across all RBs in the frequency domain available for scheduling for each subframe based on system bandwidth.

At 416, the central management system 122 sends the high mobility UE HO threshold and the low mobility UE HO threshold to the macro cell radio 116a. At 420, the macro cell radio 116a applies the high mobility UE HO threshold and the low mobility UE HO threshold to trigger handover of user equipment served by the macro cell radio 116a to the small cell radio 114a when appropriate (e.g., based on RSRP, RSRQ, SINR or some other signal strength information for each of one or more high mobility UE and/or one or more low mobility UE in relation to the HO thresholds). It should be noted that the operations performed at 414, 418 and 416, 420 can be performed at a same or different times based on the periodic basis, event-based basis, etc. as configured by a network operator for communication system 100.

Following the operations at 418, the operations can return to 402 and the operations as described above for the small cell radio 114a can be repeated according to the basis configured for the communication system. Following the operations at 418, the operations can return to 402 and the operations as described above for macro cell radio 116a can be repeated according to the basis configured for the communication system.

Figure 5:
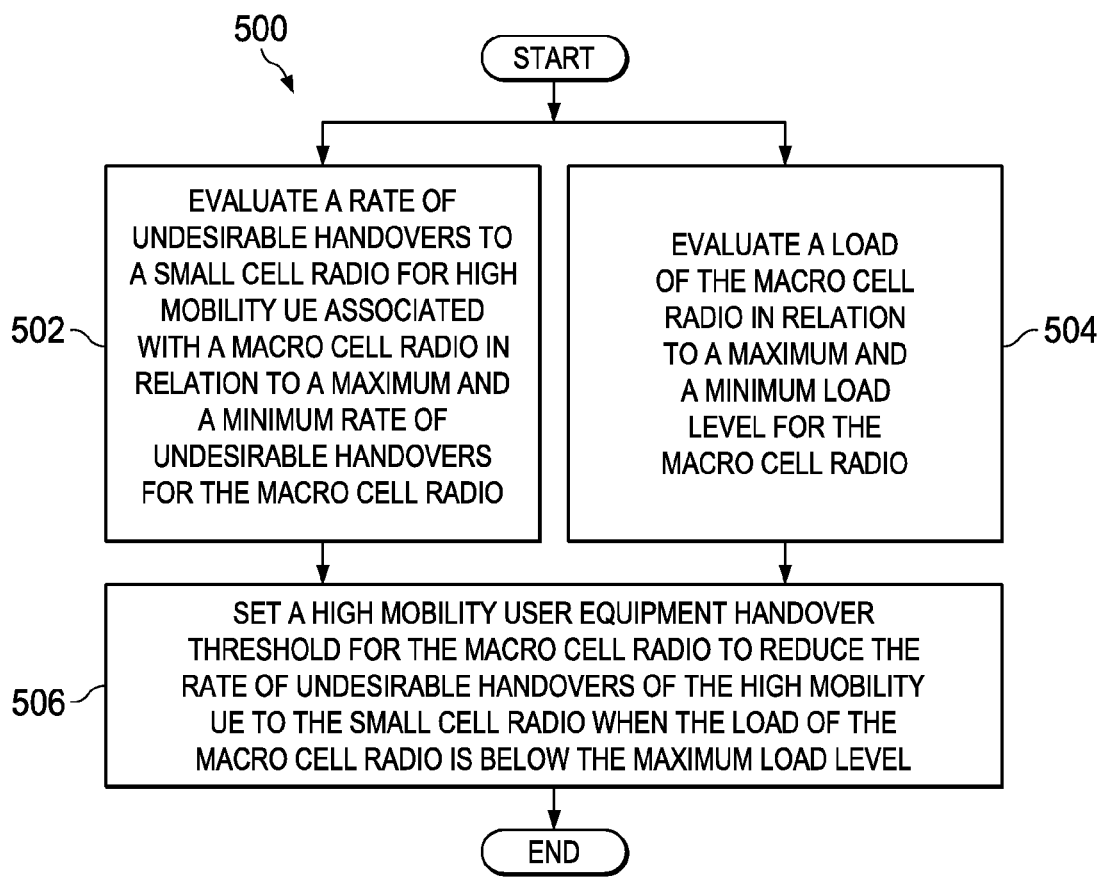
FIG. 5 is a simplified flow diagram illustrating example operations that can be associated with setting a high mobility UE handover threshold for a macro cell radio in accordance with one potential embodiment of the communication system.

Referring to FIG. 5, FIG. 5 is a simplified flow diagram illustrating example operations 500 that can be associated with setting a high mobility UE handover threshold for a macro cell radio in accordance with one potential embodiment of communication system 100. Operations 500 are described with reference to macro cell radio 116a; however, it should be understood that operations 500 can be performed equally by central management system 122 for macro cell radio 116b or any other macro cell radio that may be present in a particular deployment.

In at least one embodiment, operations 500 can be performed at central management system 122 via mobility coordination module 150 based, at least in part, on feedback information received from at least one macro cell radio(s) (e.g., macro cell radio 116a) and at least one small cell radio(s) neighboring the at least one macro cell radio(s) (e.g., small cell radio 114a neighboring macro cell radio 116a) (e.g., for performing joint optimizations of the maximum small cell transmit power(s) of the small cell radio(s)) in combination with various high mobility HO criteria (e.g., $H^{min}$, $H^{max}$, $L^{min}$ and $L^{max}$) and relationships (e.g., Relationships (1)-(4)) configured for central management system 122 and/or mobility coordination module 150 by a network operator.

Thus, operations 500 can begin at 502 in which the central management system 122 via mobility coordination module 150 evaluates a rate of undesirable handovers to small cell radio 114a for high mobility UE associated with macro cell radio 116a in relation to a maximum and a minimum rate of undesirable handovers (e.g., $H^{max}$ and $H^{min}$, respectively) as configured by a network operator. At 504, the operations can include evaluating a load of the macro cell radio in relation to a maximum and a minimum load level (e.g., $L^{max}$ and $L^{min}$, respectively) as configured by a network operator.

At 506, the operations can include central management system 122 via mobility coordination module 150 setting a high mobility UE handover threshold for the macro cell radio 116a to reduce the rate of undesirable handovers of high mobility UE to the small cell radio 114a so long as the load of the macro cell radio 116a remains below the maximum load level configured for the macro cell radio 116a. As Relationships (1)-(4) as described herein for setting a high mobility UE HO threshold for a given macro cell radio can involve evaluating one or more criteria alone or in combination as well as setting the high mobility UE HO threshold based on an evaluation of a certain Relationship, it should be understood that operations 502-506 or any other operations described herein with respect to evaluating relationships and criteria to set a mobility coordination parameter (e.g., high mobility UE HO threshold) can be performed in a parallel or a serial manner.

Figure 6:
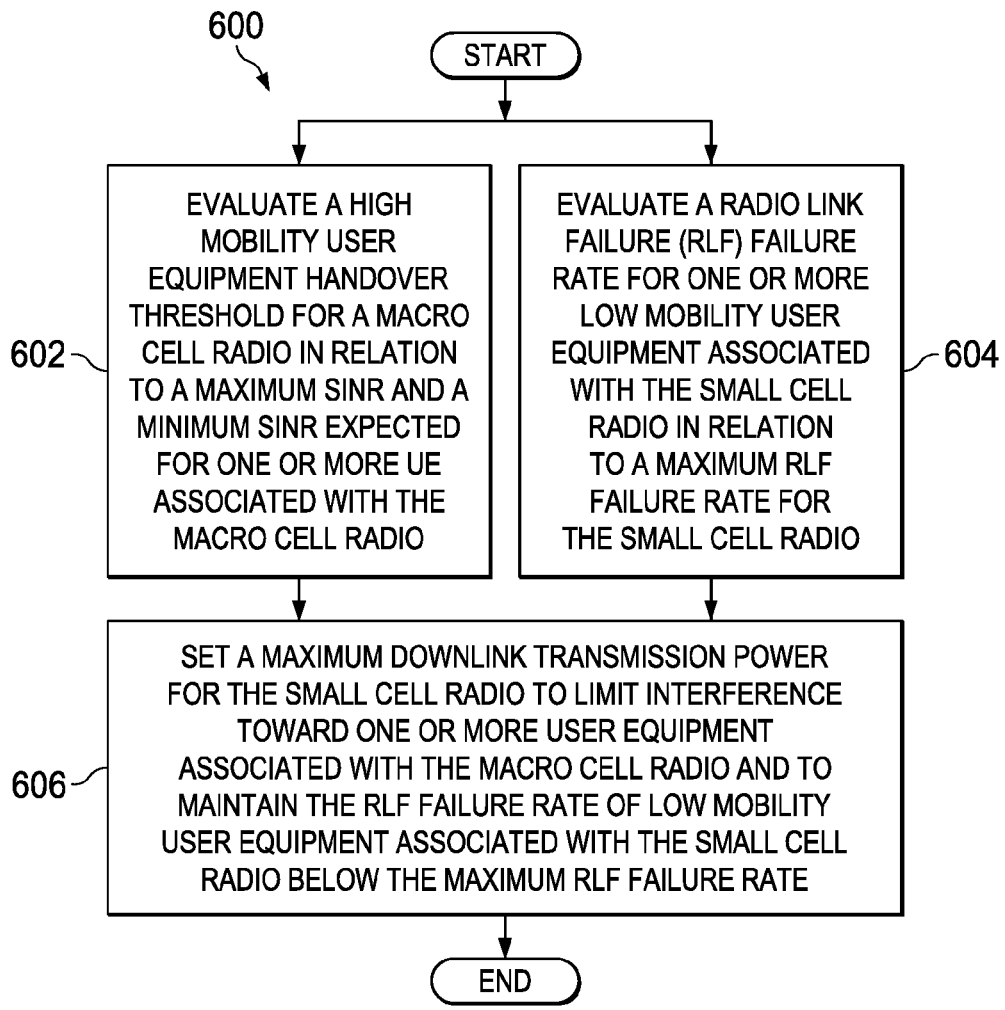
FIG. 6 is a simplified flow diagram illustrating example operations that can be associated with setting a maximum transmit power for a small cell radio in accordance with one potential embodiment of the communication system.

Referring to FIG. 6, FIG. 6 is a simplified flow diagram illustrating example operations 600 that can be associated with setting a maximum transmit power for a small cell radio in accordance with one potential embodiment of communication system 100. Operations 600 are described with reference to small cell radio 114a; however, it should be understood that operations 600 can be performed equally by central management system 122 for small cell radio 114b or any other small cell radio that may be present in a particular deployment.

In at least one embodiment, operations 600 can be performed at central management system 122 via mobility coordination module 150 based, at least in part, on feedback information received from at least one small cell radio(s) (e.g., small cell radio 114a) and at least one neighboring macro cell radio(s) (e.g., macro cell radio 116a neighboring small cell radio 114a) (e.g., for performing joint optimizations of the high mobility UE HO threshold(s) for the at least one macro cell radio(s)) in combination with various small cell transmit criteria (e.g., to $\gamma_{min}$, $\gamma_{max}$, and $R^{max}$) and relationships (e.g., Relationships [A], [B] and [E]) configured for central management system 122 and/or mobility coordination module 150 by a network operator.

Thus, operations 600 can begin at 602 in which the central management system 122 via mobility coordination module 150 evaluates a high mobility user equipment handover threshold for macro cell radio 116a in relation to a maximum SINR and a minimum SINR (e.g., $\gamma_{max}$ and $\gamma_{min}$, respectively) expected for one or more UE (e.g., UE 112a-112b) associated with the macro cell radio 116a as configured by a network operator. At 604, the operations can include the central management system via mobility coordination module evaluating an RLF failure rate for one or more low mobility UE associated with the small cell radio 114a in relation to a maximum RLF failure rate (e.g., $R^{max}$) for the small cell radio as configured by a network operator.

At 606, operations can include central management system 122 via mobility coordination module 150 setting a maximum downlink transmission power for the small cell radio 114a to limit interference toward one or more UE associated with the macro cell radio and to maintain the RLF failure rate of low mobility UEs associated with the small cell radio 114a below the maximum RLF failure rate. As Relationships [A], [B] and [E] as described herein for setting a maximum downlink transmission power for a given small cell radio can involve evaluating one or more criteria alone or in combination as well as setting the maximum downlink transmission power based on an evaluation of a certain Relationship, it should be understood that operations 602-604 or any other operations described herein with respect to evaluating relationships and criteria to set a mobility coordination parameter (e.g., maximum downlink transmission power) can be performed in a parallel or a serial manner.

Figure 7A:
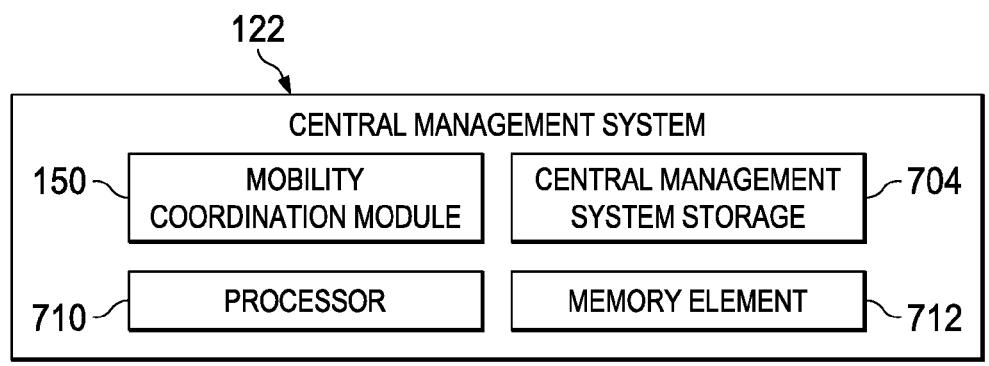
FIGS. 7A-7D are simplified block diagrams illustrating additional details associated with various potential embodiments of the communication system.
Figure 7B:
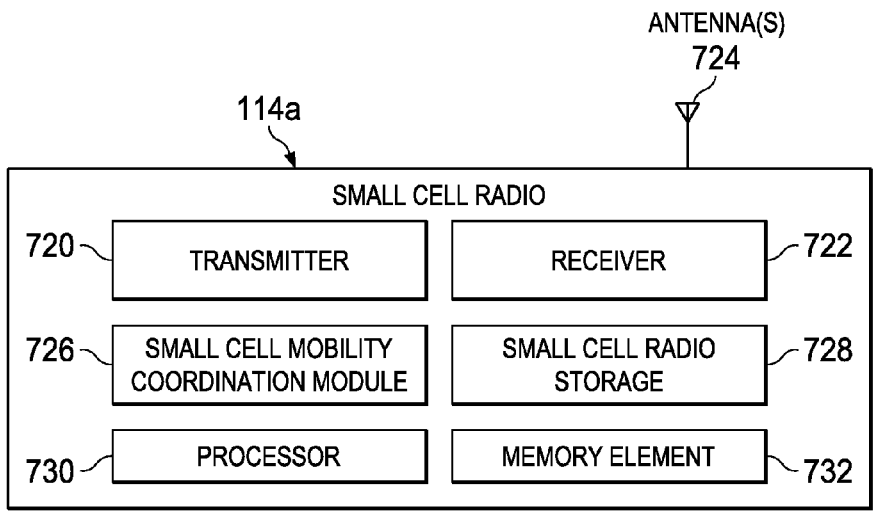
Figure 7C:
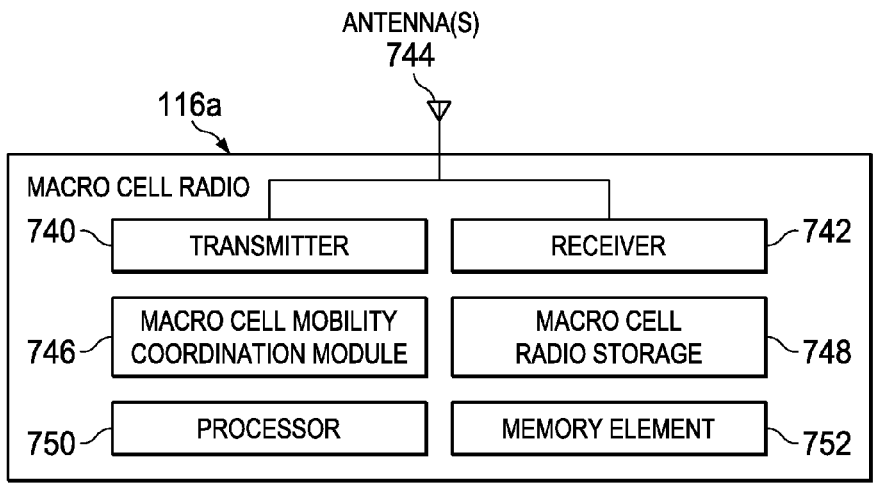
Figure 7D:
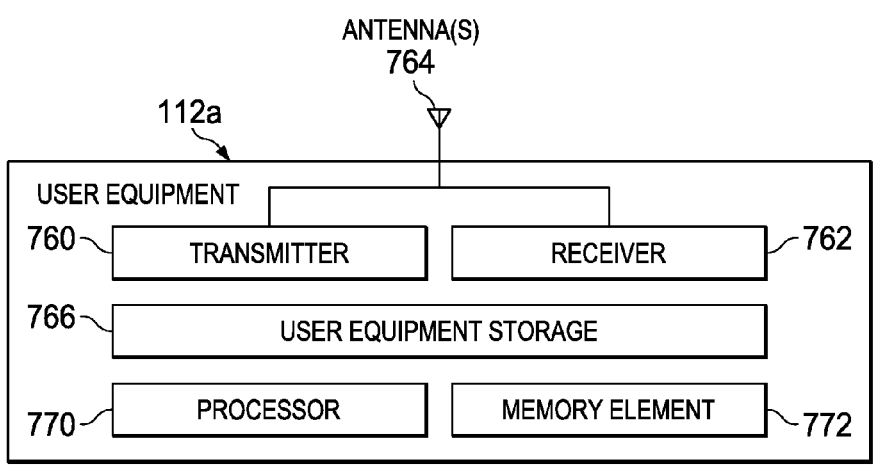

Turning to FIGS. 7A-7D, FIGS. 7A-7D are simplified block diagrams illustrating example details of various elements that can be associated with communication system 100 in accordance with one or more embodiments. FIG. 7A is a simplified block diagram illustrating example details that can be associated with central management system 122 in accordance with one embodiment of communication system 100. FIG. 7B is a simplified block diagram illustrating example details that can be associated with small cell radio 114a in accordance with one embodiment of communication system 100. FIG. 7C is a simplified block diagram illustrating example details that can be associated with macro cell radio 116a in accordance with one embodiment of communication system 100. FIG. 7D is a simplified block diagram illustrating example details that can be associated with UE 112a in accordance with one embodiment of communication system 100.

Although FIG. 7B illustrates example features related to small cell radio 114a, it should be understood that the example features as described for small cell radio 114a can also be provided with respect to small cell radio 114b. Although FIG. 7C illustrates example features related to macro cell radio 116a, it should be understood that the example features as described for macro cell radio 116a can also be provided with respect to macro cell radio 116b. Similarly, although FIG. 7D illustrates example features related to UE 112a, it should be understood that the example features as described for UE 112a can also be provided with respect to UE 112b-112e.

Referring to FIG. 7A, central management system 122 can include mobility coordination module 150, a central management system storage 704, at least one processor 710 and at least one memory element 712. In at least one embodiment, at least one processor 710 is at least one hardware processor configured to execute various tasks, operations and/or functions of central management system 122 as described herein and at least one memory element 712 is configured to store data associated with central management system 122.

In at least one embodiment, mobility coordination module 150 is configured to implement various mobility coordination operations as described herein for central management system 122, including, but not limited to, setting high mobility HO threshold(s) for one or more macro cell radio(s); setting low mobility HO threshold(s) for one or more macro cell radio(s); setting maximum downlink transmit power(s) for one or more small cell radio(s); calculating and/or evaluating undesirable handover rates for one or more macro cell radio(s); evaluating loading statistics for one or more macro cell radio(s); calculating and/or evaluating RLF failure rate(s) for low mobility UE associated with one or more small cell radio(s); combinations thereof or the like as discussed herein.

In various embodiments, central management system storage 704 can be configured to store information associated with various operations as described herein including, but not limited to, storing high mobility HO threshold criteria and relationships related to $H^{min}$, $H^{max}$, $L^{min}$ and $L^{max}$; storing small cell transmit power criteria and relationships related to $\gamma_{min}$, $\gamma_{max}$ and $R^{max}$; storing other configuration information such as: $R^{min}$, $\gamma_{nom}$, $\Delta P$, $\Delta^{dn}$, $\Delta^{up}$, macro cell related information such as: $\Delta_{HIGH}(m_i, c_i)$, $\Delta_{LOW}(m_i, c_i)$, $H(m_i, c_i)$, $L(m_i)$, FFR patterns, etc.; small cell related information such as: $P(m_i, c_i)$, $P(c_i)$, $M(c_i)$, $R(c_i)$, FFR patterns, etc.; combinations thereof or the like as discussed herein.

Referring to FIG. 7B, small cell radio 114a can include a transmitter 720, a receiver 722, one or more antenna(s) 724, a small cell mobility coordination module 726, a small cell radio storage 728, at least one processor 730 and at least one memory element 732. In at least one embodiment, at least one processor 730 is a hardware processor configured to execute various tasks, operations and/or functions of small cell radio 114a as described herein and at least one memory element 732 is configured to store data associated with small cell radio 114a.

In at least one embodiment small cell mobility coordination module 726 is configured to implement various operations as described herein for small cell radio 114a, including, but not limited to, receiving measurement reports from one or more UE served by the small cell radio, receiving mobility reports from one or more UE served by the small cell radio, receiving RLF reports from one or more UE served by the small cell radio, generating feedback information to send to central management system 122 and receiving and applying a maximum downlink transmit power level as set by the central management system via mobility coordination module 150 or other operations as described herein.

In various embodiments, small cell radio storage 728 can be configured to store information associated with various operations as described herein including, but not limited to, UE measurement report, mobility report and/or RLF report information, RLF failure rate statistics, high mobility UE classification criteria, low mobility UE classification criteria, neighboring macro cell radio information, small cell FFR patterns, macro cell FFR patterns, combinations thereof or the like as described herein. Transmitter 720, receiver 722 and one or more antenna(s) 724 can be configured to facilitate over the air communications with one or more UE.

Referring to FIG. 7C, macro cell radio 116a can include a transmitter 740, a receiver 742, one or more antenna(s) 744, a macro cell mobility coordination module 746, a macro cell radio storage 748, at least one processor 750 and at least one memory element 752. In at least one embodiment, at least one processor 750 is a hardware processor configured to execute various tasks, operations and/or functions of macro cell radio 116a as described herein and at least one memory element 752 is configured to store data associated with macro cell radio 116a.

In at least one embodiment, macro cell mobility coordination module 746 is configured to implement various operations as described herein for macro cell radio 116a, including, but not limited to, receiving measurement reports from one or more UE served by the macro cell radio, receiving mobility reports from one or more UE served by the macro cell radio, receiving RLF reports from one or more UE served by the macro cell radio, generating feedback information to send to central management system 122, receiving and applying high mobility UE HO threshold(s) $\Delta_{HIGH}(m_i, c_i)$ and low mobility HO threshold(s) $\Delta_{LOW}(m_i, c_i)$, combinations thereof or other operations as described herein.

In various embodiments, macro cell radio storage 748 can be configured to store information associated with various macro cell operations as described herein including, but not limited to, UE measurement report, mobility report and/or RLF report information, HO threshold(s) $\Delta_{HIGH}(m_i, c_i)$ and low mobility HO threshold(s) $\Delta_{LOW}(m_i, c_i)$, undesirable handover rates calculated at the macro cell radio, loading statistics calculated at the macro cell radio, high mobility UE classification criteria, low mobility UE classification criteria, small cell FFR patterns, macro cell FFR patterns combinations thereof or the like as described herein. Transmitter 740, receiver 742 and one or more antenna(s) 744 can be configured to facilitate over the air communications with one or more UE.

Referring to FIG. 7D, UE 112a can include a transmitter 760, a receiver 762, one or more antenna(s) 764, a user equipment storage 766, at least one processor 770 and at least one memory element 772. In at least one embodiment, at least one processor 770 is at least one hardware processor configured to execute various tasks, operations and/or functions of UE 112a as described herein and at least one memory element 772 is configured to store data associated with UE 112a. In various embodiments, user equipment storage 766 can be configured to store information associated with UE 112a for the operation of UE 112a. In various embodiments, transmitter 760 and receiver 762 can be connected to one or more antenna(s) 764 to facilitate the transmission and/or reception of data and/or information to/from one or more cell radios (e.g., macro call radio 116a, small cell radio 114a, etc.) using one or more over-the-air control channels and/or data channels, combinations thereof or the like.

In regards to the internal structure associated with communication system 100, additionally each of UE 112b-112e, small cell radio 114b and macro cell radio 116b may each also include a respective processor, a respective memory element and/or respective storage. Small cell radio 114b can additionally include one or more transmitters, receivers and/or antennas to facilitate over-the-air communications with UE, a respective small cell mobility coordination module and respective storage. Macro cell radio 116b can additionally include one or more transmitters, receivers and/or antennas to facilitate over-the-air communications with UE, a respective macro cell mobility coordination module and respective storage. Hence, appropriate software, hardware and/or algorithms are being provisioned in UE 112a-112e, small cell radio 114a-114b, macro cell radio 116a-116b and central management system 122 in order to facilitate mobility coordination operations as described for various embodiments discussed herein to provide small cell power control and load balancing for high mobility UE in a network environment. Note that in certain examples, certain databases (e.g., for storing information associated with mobility coordination operations for communication system 100) can be consolidated with memory elements (or vice versa), or the storage can overlap/exist in any other suitable manner.

In one example implementation, UE 112a-112e, small cell radio 114a-114b, macro cell radio 116a-116b and central management system 122 are network elements, which are meant to encompass network appliances, servers, routers, switches, gateways, bridges, loadbalancers, firewalls, processors, modules, or any other suitable device, component, element, or object operable to exchange information that facilitates or otherwise helps to facilitate small cell power control and load balancing for high mobility UE in a network environment (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 112a-112e, small cell radio 114a-114b, macro cell radio 116a-116b and central management system 122 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112a-112e, small cell radio 114a-114b, macro cell radio 116a-116b and central management system 122 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the mobility coordination operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 7A-7D] can store data used for the operations described herein. This includes the memory elements being able to store software, logic, code, or processor instructions that are executed to carry out the activities described herein. A processor (e.g., a hardware processor) can execute any type of instructions associated with the data to achieve the operations detailed herein. In one example, the processors [as shown in FIGS. 7A-7D] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, Interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of' or 'one or more of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in Interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
generating feedback information by a small cell radio and a macro cell radio;
setting a high mobility handover threshold for the macro cell radio based, at least in part, on the feedback information, wherein the high mobility handover threshold is used to trigger handover of one or more high mobility user equipment (UE) associated with the macro cell radio to the small cell radio; and
setting a maximum downlink transmit power for the small cell radio based, at least in part, on the feedback information and the high mobility handover threshold, wherein setting the maximum downlink transmit power for the small cell radio further comprises:
evaluating the high mobility handover threshold for the macro cell radio in relation to a maximum Signal-to-Interference-Plus-Noise Ratio (SINR) and a minimum SINR expected for one or more UE associated with the macro cell radio;
evaluating a Radio Link Failure (RLF) failure rate for one or more low mobility UE associated with the small cell radio in relation to a maximum RLF failure rate for the small cell radio; and
setting the maximum downlink transmit power for the small cell radio to limit interference toward the one or more UE associated with the macro cell radio and to maintain the RLF failure rate of the one or more low mobility UE associated with the small cell radio below the maximum RLF failure rate, wherein based on the maximum downlink transmit power for the small cell radio being reduced, setting the high mobility handover threshold for the macro cell radio further comprises reducing the high mobility handover threshold in proportion to an amount that the maximum downlink transmit power for the small cell radio is reduced.

2. The method of claim 1, further comprising:
receiving the feedback information by a central management system, wherein the central management system performs setting the high mobility handover threshold for the macro cell radio and setting the maximum downlink transmit power for the small cell radio.

3. The method of claim 1, wherein setting the high mobility handover threshold for the macro cell radio further comprises:
- evaluating a rate of undesirable handovers to the small cell radio of the one or more high mobility UE associated with the macro cell radio in relation to a maximum rate of undesirable handovers and a minimum rate of undesirable handovers for the macro cell radio;
- evaluating a load of the macro cell radio in relation to a maximum load and a minimum load for the macro cell radio; and
- setting the high mobility handover threshold for the macro cell radio to reduce the rate of undesirable handovers below the maximum rate of undesirable handovers when the load of the macro cell radio is below the maximum load for the macro cell radio.

4. The method of claim 1, wherein feedback information generated by the macro cell radio comprises one or more of:
- mobility information for the one or more UE associated with the macro cell radio;
- radio link failure (RLF) information for the one or more UE associated with the macro cell radio;
- measurement report information for the one or more UE associated with the macro cell radio;
- loading statistics for the macro cell radio;
- a rate of undesirable handovers of the one or more UE associated with the macro cell radio;
- a transmit power of the macro cell radio;
- the high mobility handover threshold for the macro cell radio; and
- a Fractional Frequency Reuse (FFR) pattern for the macro cell radio.

5. The method of claim 4, wherein mobility information for a particular UE comprises:
- mobility history information for the particular UE, wherein the mobility history information includes a list one or more cell radios to which the particular UE has been previously connected and a time of stay associated with each of the one or more cell radios contained in the list.

6. The method of claim 1, wherein feedback information generated by the small cell radio comprises one or more of:
- mobility information for one or more UE associated with the small cell radio;
- radio link failure (RLF) information for the one or more UE associated with the small cell radio;
- measurement report information for the one or more UE associated with the small cell radio;
- a Radio Link Failure (RLF) failure rate for the one or more UE associated with the small cell radio;
- a maximum downlink transmit power of the small cell radio; and
- a Fractional Frequency Reuse (FFR) pattern for the small cell radio.

7. One or more non-transitory tangible media encoding logic that includes instructions for execution that when executed by a processor, is operable to perform operations comprising:
- generating feedback information by a small cell radio and a macro cell radio;
- setting a high mobility handover threshold for the macro cell radio based, at least in part, on the feedback information, wherein the high mobility handover threshold is used to trigger handover of one or more high mobility user equipment (UE) associated with the macro cell radio to the small cell radio; and
- setting a maximum downlink transmit power for the small cell radio based, at least in part, on the feedback information and the high mobility handover threshold, wherein setting the maximum downlink transmit power for the small cell radio further comprises:
  - evaluating the high mobility handover threshold for the macro cell radio in relation to a maximum Signal-to-Interference-Plus-Noise Ratio (SINR) and a minimum SINR expected for one or more UE associated with the macro cell radio;
  - evaluating a Radio Link Failure (RLF) failure rate for one or more low mobility UE associated with the small cell radio in relation to a maximum RLF failure rate for the small cell radio; and
  - setting the maximum downlink transmit power for the small cell radio to limit interference toward the one or more UE associated with the macro cell radio and to maintain the RLF failure rate of the one or more low mobility UE associated with the small cell radio below the maximum RLF failure rate, wherein based on the maximum downlink transmit power for the small cell radio being reduced, setting the high mobility handover threshold for the macro cell radio further comprises reducing the high mobility handover threshold in proportion to an amount that the maximum downlink transmit power for the small cell radio is reduced.

8. The media of claim 7, the operations further comprising:
- receiving the feedback information by a central management system, wherein the central management system performs setting the high mobility handover threshold for the macro cell radio and setting the maximum downlink transmit power for the small cell radio.

9. The media of claim 7, wherein setting the high mobility handover threshold for the macro cell radio further comprises:
- evaluating a rate of undesirable handovers to the small cell radio of the one or more high mobility UE associated with the macro cell radio in relation to a maximum rate of undesirable handovers and a minimum rate of undesirable handovers for the macro cell radio;
- evaluating a load of the macro cell radio in relation to a maximum load and a minimum load for the macro cell radio; and
- setting the high mobility handover threshold for the macro cell radio to reduce the rate of undesirable handovers below the maximum rate of undesirable handovers when the load of the macro cell radio is below the maximum load for the macro cell radio.

10. The media of claim 7, wherein feedback information generated by the macro cell radio comprises one or more of:
- mobility information for the one or more UE associated with the macro cell radio;
- radio link failure (RLF) information for the one or more UE associated with the macro cell radio;
- measurement report information for the one or more UE associated with the macro cell radio;
- loading statistics for the macro cell radio;
- a rate of undesirable handovers of the one or more UE associated with the macro cell radio;
- a transmit power of the macro cell radio;
- the high mobility handover threshold for the macro cell radio; and
- a Fractional Frequency Reuse (FFR) pattern for the macro cell radio.

11. The media of claim 10, wherein mobility information for a particular UE comprises:
mobility history information for the particular UE, wherein the mobility history information includes a list one or more cell radios to which the particular UE has been previously connected and a time of stay associated with each of the one or more cell radios contained in the list.

12. The media of claim 7, wherein feedback information generated by the small cell radio comprises one or more of:
mobility information for one or more UE associated with the small cell radio;
radio link failure (RLF) information for the one or more UE associated with the small cell radio;
measurement report information for the one or more UE associated with the small cell radio;
a Radio Link Failure (RLF) failure rate for the one or more UE associated with the small cell radio;
a maximum downlink transmit power of the small cell radio; and
a Fractional Frequency Reuse (FFR) pattern for the small cell radio.

13. A system, comprising:
at least one memory element for storing data; and
at least one processor that executes instructions associated with the data, wherein the processor and the memory element cooperate such that the system is configured for:
generating feedback information by a small cell radio and a macro cell radio;
setting a high mobility handover threshold for the macro cell radio based, at least in part, on the feedback information, wherein the high mobility handover threshold is used to trigger handover of one or more high mobility user equipment (UE) associated with the macro cell radio to the small cell radio; and
setting a maximum downlink transmit power for the small cell radio based, at least in part, on the feedback information and the high mobility handover threshold, wherein setting the maximum downlink transmit power for the small cell radio further comprises:
evaluating the high mobility handover threshold for the macro cell radio in relation to a maximum Signal-to-Interference-Plus-Noise Ratio (SINR) and a minimum SINR expected for one or more UE associated with the macro cell radio;
evaluating a Radio Link Failure (RLF) failure rate for one or more low mobility UE associated with the small cell radio in relation to a maximum RLF failure rate for the small cell radio; and
setting the maximum downlink transmit power for the small cell radio to limit interference toward the one or more UE associated with the macro cell radio and to maintain the RLF failure rate of the one or more low mobility UE associated with the small cell radio below the maximum RLF failure rate, wherein based on the maximum downlink transmit power for the small cell radio being reduced, setting the high mobility handover threshold for the macro cell radio further comprises reducing the high mobility handover threshold in proportion to an amount that the maximum downlink transmit power for the small cell radio is reduced.

14. The system of claim 13, wherein the system is further configured for:
receiving the feedback information by a central management system, wherein the central management system performs setting the high mobility handover threshold for the macro cell radio and setting the maximum downlink transmit power for the small cell radio.

15. The system of claim 13, wherein setting the high mobility handover threshold for the macro cell radio further comprises:
evaluating a rate of undesirable handovers to the small cell radio of the one or more high mobility UE associated with the macro cell radio in relation to a maximum rate of undesirable handovers and a minimum rate of undesirable handovers for the macro cell radio;
evaluating a load of the macro cell radio in relation to a maximum load and a minimum load for the macro cell radio; and
setting the high mobility handover threshold for the macro cell radio to reduce the rate of undesirable handovers below the maximum rate of undesirable handovers when the load of the macro cell radio is below the maximum load for the macro cell radio.

16. The system of claim 13, wherein feedback information generated by the macro cell radio comprises one or more of:
mobility information for the one or more UE associated with the macro cell radio;
radio link failure (RLF) information for the one or more UE associated with the macro cell radio;
measurement report information for the one or more UE associated with the macro cell radio;
loading statistics for the macro cell radio;
a rate of undesirable handovers of the one or more UE associated with the macro cell radio;
a transmit power of the macro cell radio;
the high mobility handover threshold for the macro cell radio; and
a Fractional Frequency Reuse (FFR) pattern for the macro cell radio.

17. The system of claim 16, wherein mobility information for a particular UE comprises:
mobility history information for the particular UE, wherein the mobility history information includes a list one or more cell radios to which the particular UE has been previously connected and a time of stay associated with each of the one or more cell radios contained in the list.

18. The system of claim 13, wherein feedback information generated by the small cell radio comprises one or more of:
mobility information for one or more UE associated with the small cell radio;
radio link failure (RLF) information for the one or more UE associated with the small cell radio;
measurement report information for the one or more UE associated with the small cell radio;
a Radio Link Failure (RLF) failure rate for the one or more UE associated with the small cell radio;
a maximum downlink transmit power of the small cell radio; and
a Fractional Frequency Reuse (FFR) pattern for the small cell radio.

* * * * *

UNITED STATES PATENT AND TRADEMARK OFFICE
CERTIFICATE OF CORRECTION

PATENT NO. : 9,813,970 B2
APPLICATION NO. : 15/002187
DATED : November 7, 2017
INVENTOR(S) : Ritesh K. Madan et al.

It is certified that error appears in the above-identified patent and that said Letters Patent is hereby corrected as shown below:

On the page 4, in Column 2, under "Other Publications", Line 8, delete "Foordination" and insert -- Coordination --, therefor.

On the page 4, in Column 2, under "Other Publications", Line 21, delete "Sofia" and insert -- Sophia --, therefor.

On the page 4, in Column 2, under "Other Publications", Line 21, delete "12" and insert -- 23 --, therefor.

On the page 4, in Column 2, under "Other Publications", Line 55, delete "9UMTS);" and insert -- (UMTS); --, therefor.

On the page 5, in Column 1, under "Other Publications", Line 30, delete "T525.367" and insert -- TS25.367 --, therefor.

On the page 5, in Column 2, under "Other Publications", Line 18, delete "Standard" and insert -- Standards --, therefor.

On the page 5, in Column 2, under "Other Publications", Line 19, delete "Section" and insert -- Sections --, therefor.

On the page 5, in Column 2, under "Other Publications", Line 21, delete "Specificaton:" and insert -- Specification: --, therefor.

On the page 5, in Column 2, under "Other Publications", Line 67, delete "Sofia" and insert -- Sophia --, therefor.

On the page 5, in Column 2, under "Other Publications", Line 70, delete "(U-UTRA);" and insert -- (E-UTRA); --, therefor.

Signed and Sealed this
Twentieth Day of February, 2018

Andrei Iancu
*Director of the United States Patent and Trademark Office*

CERTIFICATE OF CORRECTION (continued)
U.S. Pat. No. 9,813,970 B2

On the page 6, in Column 1, under "Other Publications", Line 3, delete "Specificaton:" and insert -- Specification: --, therefor.

On the page 7, in Column 2, under "Other Publications", Line 16, delete "reselction" and insert -- reselection --, therefor.

On the page 7, in Column 2, under "Other Publications", Line 67, delete "Frmto" and insert -- Femto --, therefor.

On the page 8, in Column 2, under "Other Publications", Lines 12-13, delete "Mitiation" and insert -- Mitigation --, therefor.

On the page 9, in Column 1, under "Other Publications", Line 64, delete "Trhoughput" and insert -- Throughput --, therefor.

On the page 9, in Column 2, under "Other Publications", Line 40, delete "pages.w" and insert -- pages. --, therefor.

On the page 9, in Column 2, under "Other Publications", Line 56, delete "9UMTS);" and insert -- (UMTS); --, therefor.

On the page 9, in Column 2, under "Other Publications", Line 64, delete "9UMTS);" and insert -- (UMTS); --, therefor.

On the page 10, in Column 1, under "Other Publications", Line 54, delete "Netework" and insert -- Network --, therefor.

On the page 10, in Column 2, under "Other Publications", Line 43, delete "Febuary" and insert -- February --, therefor.

On the Sheet 7 of 10, in Figure 4, reference numeral 402, Line 2, delete "INFROMATION" and insert -- INFORMATION --, therefor.

In Column 3, Line 29, after "list" insert -- of --.

In Column 4, Line 10, delete "'emtocell'" and insert -- 'femtocell' --, therefor.

In Column 5, Line 63, delete "Indicators," and insert -- indicators, --, therefor.

In Column 7, Line 50, delete "m)." and insert -- $m_i$). --, therefor.

In Column 8, Line 23, delete "-interference-" and insert -- -Interference- --, therefor.

In Column 12, Line 12, delete "'$L^{max}$',"  and insert -- '$L^{max}$' --, therefor.

In Column 16, Line 31, delete "(1-4)" and insert -- (1)-(4) --, therefor.

CERTIFICATE OF CORRECTION (continued)
U.S. Pat. No. 9,813,970 B2

In Column 17, Line 2, delete "Is" and insert -- is --, therefor.

In Column 18, Line 52, delete "$\Delta T_{hysterisis}$," and insert -- $\Delta T_{hysteresis}$, --, therefor.

In Column 18, Line 55, delete "$\Delta T_{hysterisis}$" and insert -- $\Delta T_{hysteresis}$ --, therefor.

In Column 22, Line 9, delete "(WIMAX))" and insert -- (WiMAX)) --, therefor.

In Column 22, Line 26, delete "Interconnectivity" and insert -- interconnectivity --, therefor.

In Column 24, Line 60, delete "In" and insert -- in --, therefor.

In Column 24, Line 62, delete "In" and insert -- in --, therefor.

In Column 25, Line 47, delete "that that" and insert -- that --, therefor.

In Column 28, Line 53, delete "$\gamma_{max}$," and insert -- $\gamma_{max}$ --, therefor.

In Column 33, Line 33, delete "Interaction" and insert -- interaction --, therefor.

In Column 34, Line 17, delete "Interpreting" and insert -- interpreting --, therefor.

In Column 35, Line 37, in Claim 5, after "list" insert -- of --.

In Column 37, Line 4, in Claim 11, after "list" insert -- of --.

In Column 38, Line 45, in Claim 17, after "list" insert -- of --.